US010899537B2

(12) United States Patent
Aggarwala et al.

(10) Patent No.: US 10,899,537 B2
(45) Date of Patent: Jan. 26, 2021

(54) WASTE CHUTE DEVICES AND METHODS FOR USING THE SAME

(71) Applicant: Sidewalk Labs LLC, New York, NY (US)

(72) Inventors: Rohit Thomas Aggarwala, New York, NY (US); Anand Naga Babu, New York, NY (US); Jesse Shapins, New York, NY (US); Matthew Eli Breuer, New York, NY (US); Violet Whitney, Long Island City, NY (US); Daniel Henry Vanderkam, Brooklyn, NY (US); Michael Constantine Mattheakis, Cupertino, CA (US); Thomas Joseph Kennedy, Brooklyn, NY (US); Amanda Meurer, Brooklyn, NY (US)

(73) Assignee: Sidewalk Labs LLC, New York, NY (US)

( * ) Notice: Subject to any disclaimer, the term of this patent is extended or adjusted under 35 U.S.C. 154(b) by 0 days.

(21) Appl. No.: 16/594,766

(22) Filed: Oct. 7, 2019

(65) Prior Publication Data

US 2020/0216259 A1 Jul. 9, 2020

Related U.S. Application Data

(63) Continuation of application No. 16/049,283, filed on Jul. 30, 2018, now Pat. No. 10,435,236.

(Continued)

(51) Int. Cl.

| | |
|---|---|
| ***B65F 1/00*** | (2006.01) |
| ***B65G 11/00*** | (2006.01) |
| ***B65F 1/10*** | (2006.01) |

(52) U.S. Cl.

CPC .............. *B65F 1/0093* (2013.01); *B65F 1/10* (2013.01); *B65F 2210/108* (2013.01);

(Continued)

(58) Field of Classification Search

None

See application file for complete search history.

(56) References Cited

U.S. PATENT DOCUMENTS

| | | | | |
|---|---|---|---|---|
| 7,080,777 B2 * | 7/2006 | Wagner | B07C 7/005 235/385 |
| 7,660,724 B2 * | 2/2010 | Mallett | B07C 5/3412 705/1.1 |

(Continued)

OTHER PUBLICATIONS

Notice of Allowance dated May 28, 2019 in U.S. Appl. No. 16/049,283, pp. 1-19.

(Continued)

*Primary Examiner* — Kavel Singh

(74) *Attorney, Agent, or Firm* — Byrne Poh LLP

(57) ABSTRACT

Waste chute devices and methods for using the same are provided. In some embodiments, a method for operating waste chutes comprises: receiving, using a hardware processor of a waste chute device, an identity associated with a user of the waste chute device; in response to receiving the identity associated with the user, allowing, using the hardware processor, a door of the waste chute device to be opened; determining, using the hardware processor, a number of items and at least one type associated with the items that have been placed in an opening of the waste chute device; determining, using the hardware processor, that the door of the waste chute device has been closed; updating, using the hardware processor, information associated with the user based on the number of items and the at least one type of items that have been placed in the opening of the (Continued)

waste chute device; and providing, using the hardware processor, the user with the updated information.

24 Claims, 11 Drawing Sheets

Related U.S. Application Data

(60) Provisional application No. 62/538,539, filed on Jul. 28, 2017.

(52) U.S. Cl.
CPC ... *B65F 2210/124* (2013.01); *B65F 2210/128* (2013.01); *B65F 2210/138* (2013.01); *B65F 2210/148* (2013.01); *B65F 2210/168* (2013.01); *B65F 2210/184* (2013.01)

(56) References Cited

U.S. PATENT DOCUMENTS

| | | | | |
|---|---|---|---|---|
| 8,616,397 | B2 * | 12/2013 | Maness .................. | A61B 50/36 220/4.12 |
| 9,352,887 | B2 | 5/2016 | Poss et al. | |
| 9,821,344 | B2 * | 11/2017 | Zsigmond .......... | G06Q 30/0601 |
| 2008/0190953 | A1 | 8/2008 | Mallett et al. | |
| 2015/0144012 | A1 | 5/2015 | Frybarger | |

OTHER PUBLICATIONS

Office Action dated Apr. 24, 2019 in U.S. Appl. No. 16/049,283, pp. 1-15.

* cited by examiner

WASTE CHUTE DEVICES AND METHODS FOR USING THE SAME

CROSS-REFERENCE TO RELATED APPLICATIONS

This application is a continuation of U.S. patent application Ser. No. 16/049,283, filed Jul. 30, 2018, which claims the benefit of U.S. Provisional Patent Application No. 62/538,539, filed Jul. 28, 2017, each of which is hereby incorporated by reference herein in its entirety.

TECHNICAL FIELD

The disclosed subject matter relates to waste chute devices and methods for using the same.

BACKGROUND

Many municipalities have implemented various approaches to decrease the amount of trash that is being thrown away. For example, some have implemented pay-as-you-throw policies, which charge households for waste based on the number of bags or the number of bins of waste. However, these policies can be difficult to implement in multi-family buildings or other large building having many occupants. For example, it can be difficult to identify violations of the pay-as-you-throw policies in a multi-family building. In another example, it can be difficult to attribute garbage bags to individuals or residential units in a multi-family building or other large building having many occupants. While these violations may be easier to effect in such a setting, such violations are more difficult to detect.

Accordingly, it is desirable to provide new waste chute devices and methods for using the same.

SUMMARY

In accordance with various embodiments of the disclosed subject matter, waste chute devices and methods for using the same are provided.

In accordance with some embodiments of the disclosed subject matter, a method for operating waste chutes is provided, the method comprising: receiving, using a hardware processor of a waste chute device, an identity associated with a user of the waste chute device; in response to receiving the identity associated with the user, allowing, using the hardware processor, a door of the waste chute device to be opened; determining, using the hardware processor, a number of items and at least one type associated with the items that have been placed in an opening of the waste chute device; determining, using the hardware processor, that the door of the waste chute device has been closed; updating, using the hardware processor, information associated with the user based on the number of items and the at least one type of items that have been placed in the opening of the waste chute device; and providing, using the hardware processor, the user with the updated information.

In some embodiments, allowing the door of the waste chute device to be opened comprises transmitting an instruction to an actuator that is connected to the hardware processor of the waste chute device, wherein the instruction causes the actuator to automatically open the door of the waste chute device.

In some embodiments, allowing the door of the waste chute device to be opened comprises transmitting an instruction to an electronic lock that is connected to the hardware processor of the waste chute device, wherein the instruction causes the electronic lock to unlock the door of the waste chute device.

In some embodiments, the updated information includes fee information for disposing the items placed in the opening of the waste chute device.

In some embodiments, the identity associated the user includes an identifier corresponding to a dwelling of the user. In some embodiments, the method further comprises associating with a mobile device of the user, wherein the identity of the user is determined based on the association with the mobile device.

In some embodiments, determining the number of items is based on a user selection of a number of trash bags received via a user interface presented on a computing device associated with the waste chute device. In some embodiments, the method further comprises: receiving imaging data from an imaging device connected to the hardware processor, wherein the imaging data is used to determine the number of items placed in the waste chute device; and comparing the number of items received via the user interface with the number of items determined from the imaging data. In some embodiments, the method further comprises: receiving sensor data from a through-beam sensor that is connected to the hardware processor and that emits a beam within the opening of the waste chute device; and comparing the number of items received via the user interface with the number of items determined from the sensor data.

In some embodiments, the method further comprises determining that the items that have been placed in the waste chute device are not to be accepted based on the at least one type associated with items that have been placed in the waste chute device.

In some embodiments, the method further comprises: receiving weight data associated with the items that have been placed in the waste chute device via a scale connected to the hardware processor; and determining whether the weight data corresponds to the number of items placed in the waste chute device.

In accordance with some embodiments of the disclosed subject matter, a waste chute device is provided, the waste chute device comprising: a chute door on a housing of the waste chute device that, when opened, provides an opening that is connected to a vertical waste chute; an actuator that is connected to the chute door; a computing device positioned within the housing of the waste chute device; and a hardware processor connected to the actuator and the computing device. In some embodiments, the hardware processor is configured to: receive an identity associated with a user of the waste chute device; in response to receiving the identity associated with the user, transmitting an instruction to the actuator that automatically opens the chute door; determine a number of items and at least one type associated with the items that have been placed in the opening of the waste chute device; determine that the chute door of the waste chute device has been closed; update information associated with the user based on the number of items and the at least one type of items that have been placed in the opening of the waste chute device; and cause the updated information to be presented on a display of the computing device.

In accordance with some embodiments of the disclosed subject matter, a non-transitory computer-readable medium containing computer executable instructions that, when executed by a processor, cause the processor to perform a method for operating waste chutes is provided, the method comprising: receiving an identity associated with a user of a waste chute device; in response to receiving the identity associated with the user, allowing a door of the waste chute device to be opened; determining a number of items and at least one type associated with the items that have been placed in an opening of the waste chute device; determining that the door of the waste chute device has been closed; updating information associated with the user based on the number of items and the at least one type of items that have been placed in the opening of the waste chute device; and providing the user with the updated information.

In accordance with some embodiments of the disclosed subject matter, a system for operating waste chutes is provided, the system comprising: means for receiving an identity associated with a user of a waste chute device; means for allowing a door of the waste chute device to be opened in response to receiving the identity associated with the user; means for determining a number of items and at least one type associated with the items that have been placed in an opening of the waste chute device; means for determining that the door of the waste chute device has been closed; means for updating information associated with the user based on the number of items and the at least one type of items that have been placed in the opening of the waste chute device; and means for providing the user with the updated information.

In accordance with some embodiments of the disclosed subject matter, a method for operating waste chutes is provided, the method comprising: determining an identity associated with a user of a waste chute device; receiving, via a first user interface presented on a computing device connected to the waste chute device, an input to open a door of the waste chute device; in response to receiving the input to open the door, transmitting a first control signal to an actuator that is connected to the door and that causes the door to be opened upon receiving the first control signal; determining a number of items placed in the waste chute device; updating information associated with the user based on the number of items placed in the waste chute device; causing a second user interface to be presented on the computing device that indicates a duration of time until the door is closed; and in response to determining that the duration of time has elapsed, transmitting a second control signal to the actuator associated with the door that causes the door to be closed.

In some embodiments, an electronic interlock is connected to the door of the waste chute device and the method further comprises transmitting an unlock control signal to the electronic interlock that causes the door of the waste chute device to be unlocked.

In some embodiments, an imaging device is connected to the waste chute device and the method further comprises receiving image data from the imaging device associated with the items placed in the waste chute device. In some embodiments, the number of items placed in the waste chute device is determined from the received image data.

In some embodiments, a scale is connected to the waste chute device and the method further comprises receiving weight data associated with the items placed in the waste chute device. In some embodiments, the method further comprises determining whether the weight data corresponds with the number of items placed in the waste chute device. In some embodiments, the method further comprises determining whether the weight data corresponds with the type of items placed in the waste chute device.

In accordance with some embodiments of the disclosed subject matter, a waste chute device is provided, the waste chute device comprising: a chute door on a housing of the waste chute device that, when opened, provides an opening that is connected to a vertical waste chute; an actuator that is connected to the chute door; a computing device positioned within the housing of the waste chute device; and a hardware processor connected to the actuator and the computing device. In some embodiments, the hardware processor is configured to: determine an identity associated with a user of the waste chute device; receive, via a first user interface presented on the computing device, an input to open the chute door of the waste chute device; in response to receiving the input to open the chute door, transmit a first control signal to the actuator that causes the chute door to be opened upon receiving the first control signal; determine a number of items placed in the opening of the waste chute device; update information associated with the user based on the number of items placed in the opening of the waste chute device; cause a second user interface to be presented on the computing device that indicates a duration of time until the chute door is closed; and, in response to determining that the duration of time has elapsed, transmit a second control signal to the actuator that causes the chute door to be closed.

In accordance with some embodiments of the disclosed subject matter, a non-transitory computer-readable medium containing computer executable instructions that, when executed by a processor, cause the processor to perform a method for operating waste chutes is provided, the method comprising: determining an identity associated with a user of a waste chute device; receiving, via a first user interface presented on a computing device connected to the waste chute device, an input to open a door of the waste chute device; in response to receiving the input to open the door, transmitting a first control signal to an actuator that is connected to the door and that causes the door to be opened upon receiving the first control signal; determining a number of items placed in the waste chute device; updating information associated with the user based on the number of items placed in the waste chute device; causing a second user interface to be presented on the computing device that indicates a duration of time until the door is closed; and in response to determining that the duration of time has elapsed, transmitting a second control signal to the actuator associated with the door that causes the door to be closed.

In accordance with some embodiments of the disclosed subject matter, a system for operating waste chutes is provided, the system comprising: means for determining an identity associated with a user of a waste chute device; means for receiving, via a first user interface presented on a computing device connected to the waste chute device, an input to open a door of the waste chute device; means for transmitting a first control signal to an actuator that is connected to the door and that causes the door to be opened upon receiving the first control signal in response to receiving the input to open the door; means for determining a number of items placed in the waste chute device; means for updating information associated with the user based on the number of items placed in the waste chute device; means for causing a second user interface to be presented on the computing device that indicates a duration of time until the door is closed; and means for transmitting a second control signal to the actuator associated with the door that causes the door to be closed in response to determining that the duration of time has elapsed.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
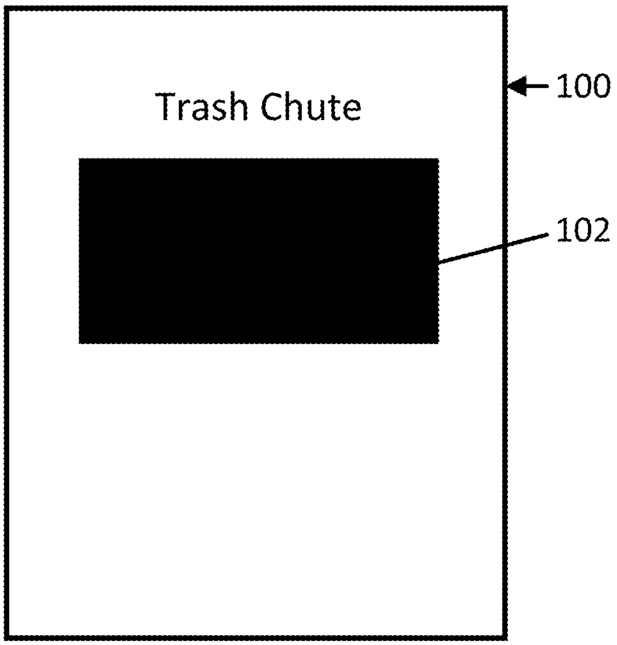
FIG. 1 shows an illustrative example of a waste chute device in accordance with some embodiments of the disclosed subject matter.

In accordance with various embodiments, mechanisms (which can include methods, systems, and media) for operating waste chutes are provided.

In some embodiments, the mechanisms described herein can control the operation of a waste chute device. For example, in some embodiments, the mechanisms can include a computing device that is connected to the waste chute device, where the computing device can, among other things, present one or more user interfaces associated with using the waste chute device. As a more particular example, in some embodiments, the computing device can present a user interface for receiving an input from a user that causes a door of the waste chute device to be opened. In response to receiving a suitable input from the user (e.g., a user identifier), the mechanisms can transmit a control signal from the computing device to an actuator that is connected to the waste chute door that controls the movement and/or a lock of the door. It should be noted that, in some embodiments, the user interface can receive any other suitable information, such as an identity of the user, a number of bags of trash to be placed into the waste chute, a confirmation that the user is aware of one or more rules (e.g., pay-as-you-throw rules, disposal rules, etc.), and/or any other suitable information. After causing the waste chute door to be opened via the actuator, the mechanisms can determine whether a predetermined duration of time has elapsed, and, after determining that the predetermined duration of time has elapsed, can cause the waste chute door to be closed.

In some embodiments, alternatively to causing the actuator to control the opening and/or closing of the waste chute door, the mechanisms can enable the waste chute device to be used in response to receiving a suitable input from the user. This can include, for example, unlocking the door to the waste chute in response to confirming the identity of the user. This can also include, for example, transitioning the waste chute device from a sleep state to an operational state.

In some embodiments, the mechanisms can present any suitable information on the computing device. For example, in some embodiments, the mechanisms can present the user with a score or other suitable metric that indicates a total amount of trash that the user has thrown away (e.g., over the past week, over the past month, over the past year, and/or over any other suitable time period). As another example, in some embodiments, the mechanisms can, upon using the waste chute to dispose of a particular number of trash items, update the score or metric associated with the user, compare the score or metric associated with the user with other users (e.g., neighbors on the same floor as the user, neighbors in the same building as the user, neighbors in the same neighborhood as the user, etc.), and present the comparison of the score or metric associated with the user to scores or metrics associated with other users. As yet another example, in some embodiments, the mechanisms can present a charge or fee associated with the amount of trash that has been placed in the waste chute to comply with any suitable regulations, such as pay-as-you-throw regulations. In continuing this example, the mechanisms can cause the charge or fee to be deducted from a payment account (e.g., a payment account associated with a residential unit, a credit card associated with an identifier, etc.).

In some embodiments, the mechanisms can receive information from any suitable sources to determine what has been placed in the waste chute. For example, in some embodiments, the mechanisms can receive image or video data from a camera device connected to the waste chute (e.g., a camera device located inside the waste chute and/or any other suitable sensor) that can determine the number of bags that a user has placed in the waste chute, determine the type of items that have been placed in the waste chute (e.g., organic waste, recyclable materials, etc.), determine the amount of a particular item that has been placed in the waste chute (e.g., an estimate of an amount of organic waste placed in the waste chute based on an image), etc. As another example, in some embodiments, the mechanisms can receive sensor data from a sensor (e.g., an infrared beam-through sensor located inside the waste chute), determine the number of times an infrared beam emitted by the beam-through sensor has been disrupted and correlating the number of disruptions with a number of items placed in the waste chute, etc. As another example, in some embodiments, the mechanisms can receive data from a scale or other sensor connected to the waste chute that can be used to determine a weight associated with the items placed in the waste chute. As yet another example, in some embodiments, the mechanisms can receive data, such as sensor data, from a building management system that is communicating with the waste chute.

In some embodiments, the mechanisms can receive information from any suitable sources to determine whether the user may be violating one or more rules or criteria. For example, in some embodiments, the mechanisms can receive image or video data from a camera device connected to the waste chute (e.g., a camera device located in a room in which the waste chute is located, a camera device located inside the waste chute, and/or any other suitable imaging device) that can determine whether the user has placed more than a predetermined number of bags of trash in the waste chute, whether the user has placed recyclable items in a waste chute, and/or any other suitable violations. As another example, in some embodiments, the mechanisms can receive data from a scale or other sensor connected to the waste chute that can be used to determine whether the user has placed items that exceed a predetermined weight threshold in the waste chute or whether a weight measurement obtained by the scale does not correspond with an indicated type of waste item placed in the waste chute (e.g., a weight measurement of thirty pounds for one bag of recyclable plastic bottles). In some embodiments, in response to determining that the user has violated particular rules, the mechanisms can present an indication on the computing device of the detected violation, charge the user a penalty for the detected violation, inhibit the bags placed in the waste chute from being accepted, and/or perform any other suitable action.

In a more particular example, the mechanisms can receive sensor data that indicates the number of time a beam has been broken. For example, the mechanism can include a through-beam sensor system having an emitter and a receiver or any other suitable photoelectric sensors that transmits a light beam and detects the number of times that the light beam has been disrupted. The number of times that the light beam has been disrupted can be correlated with the number of items that have been placed in the waste chute. To determine whether the user may be violating one or more rules or criteria, the mechanisms can compare the number of beam disruptions in a given transaction with the number of bags inputted on a user interface by the user.

Figure 4:
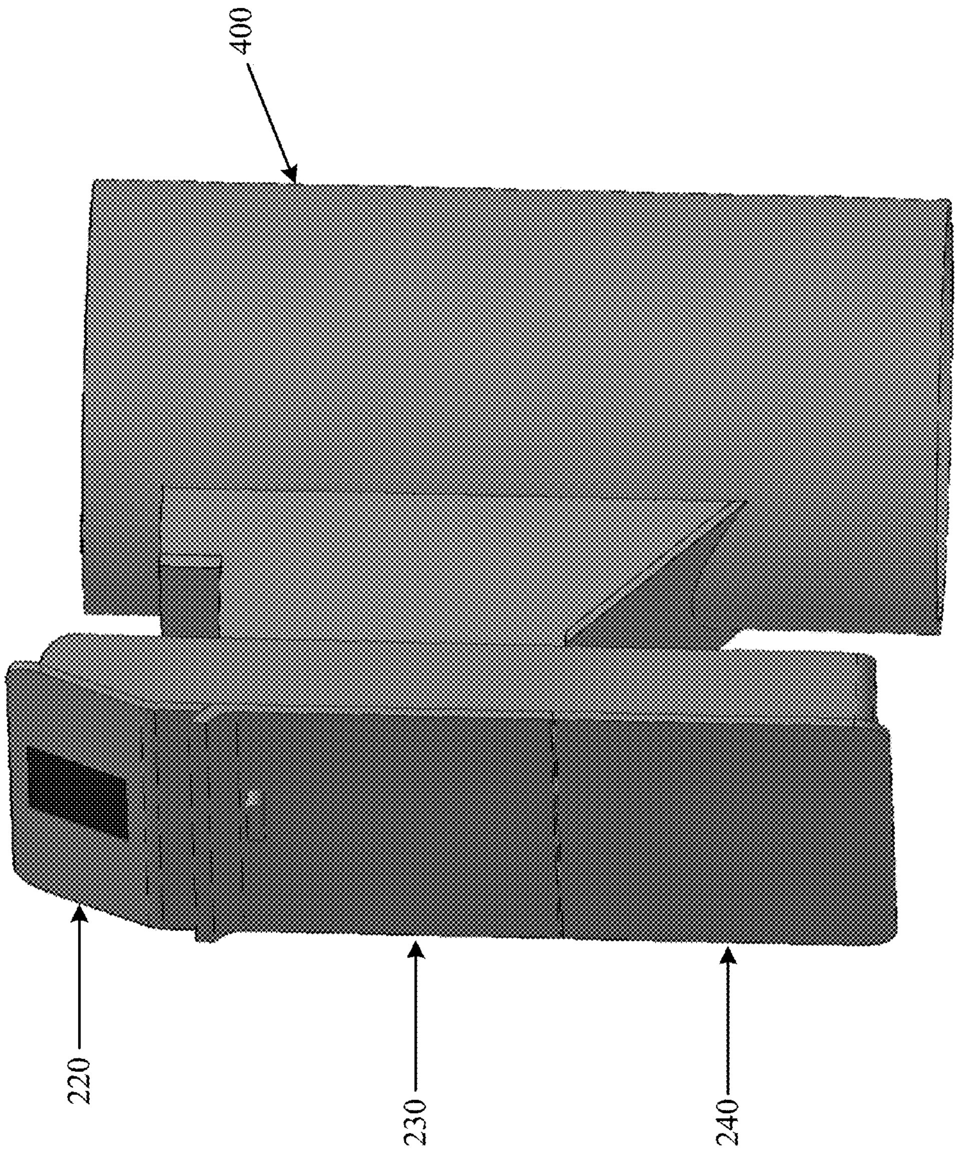
FIG. 4 shows an illustrative example of a waste chute device connected to a vertical waste chute riser in accordance with some embodiments of the disclosed subject matter.

Turning to FIG. 1, an example of a waste chute device 100 is shown in accordance with some embodiments of the disclosed subject matter. Waste chute device 100 can be any suitable chute connected to a receptacle for receiving trash or other waste products. For example, in some embodiments, waste chute device 100 can be a waste chute device connected to a trash can, a dumpster, a recycling can, and/or any other suitable container. In some embodiments, waste chute device 100 can be in any suitable location, such as in a housing building, in an office building, and/or in any other suitable location. In a more particular example, FIG. 4 shows an illustrative example where a waste chute device 100 can be connected to a vertical chute riser that leads to a central waste container, such as that in an apartment building. In such an example, a waste chute device 100 can be connected along the vertical chute riser corresponding to floors or levels of an apartment building.

In some embodiments, waste chute device 100 can have a waste chute door 102, as shown in FIG. 1. In some embodiments, waste chute door 102 can be of any suitable size, for example, large enough to receive any suitable size trash or recycling bag. In some embodiments, waste chute door 102 can be a particular size to accommodate a chute riser. Although not shown, in some embodiments, waste chute door 102 can have a handle to open waste chute door 102.

Figure 2:
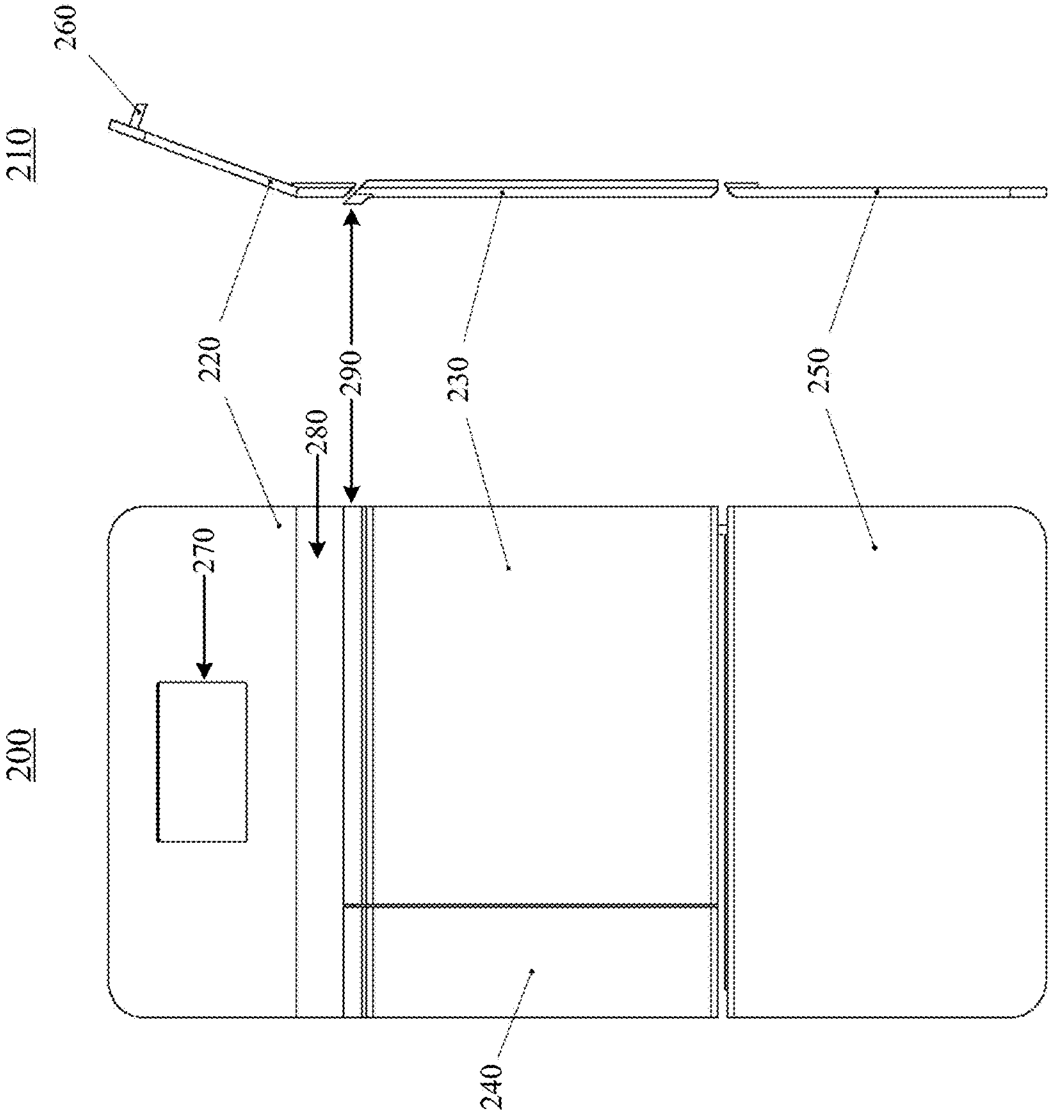
FIG. 2 shows an illustrative example of an exterior housing of a waste chute device in accordance with some embodiments of the disclosed subject matter.

FIG. 2 shows an illustrative embodiment of the exterior housing of waste chute device 100 in accordance with some embodiments of the disclosed subject matter. For example, as shown in front view 200 and side view 210 of the exterior housing of waste chute device 100 in FIG. 2, the exterior housing of waste chute device 100 can include multiple bonded or attached sub-assemblies—e.g., a fascia top sub-assembly 220, a door fascia sub-assembly 230, a fixed door panel sub-assembly 240, a bottom panel assembly 250, and a top panel assembly 260.

Fascia top sub-assembly 220 can, in some embodiments, include a region 270 for the positioning of a computing device that is connected to or integrated with waste chute device 100 (e.g., a tablet computing device used to interact with waste chute device 100). For example, region 270 can include a window in which a display for presenting waste chute usage information to a user can be placed. In another example, region 270 can include an interface for connecting a computing device, such as a tablet computing device, that presents waste chute usage information. In some embodiments, fascia top sub-assembly 220 can include a door panel 280 that is positioned above door fascia sub-assembly 230 and fixed door panel sub-assembly 240. For example, as shown in side view 210, a portion of fascia top sub-assembly 220 can be positioned at an angle in comparison with door panel 260.

Figure 3:
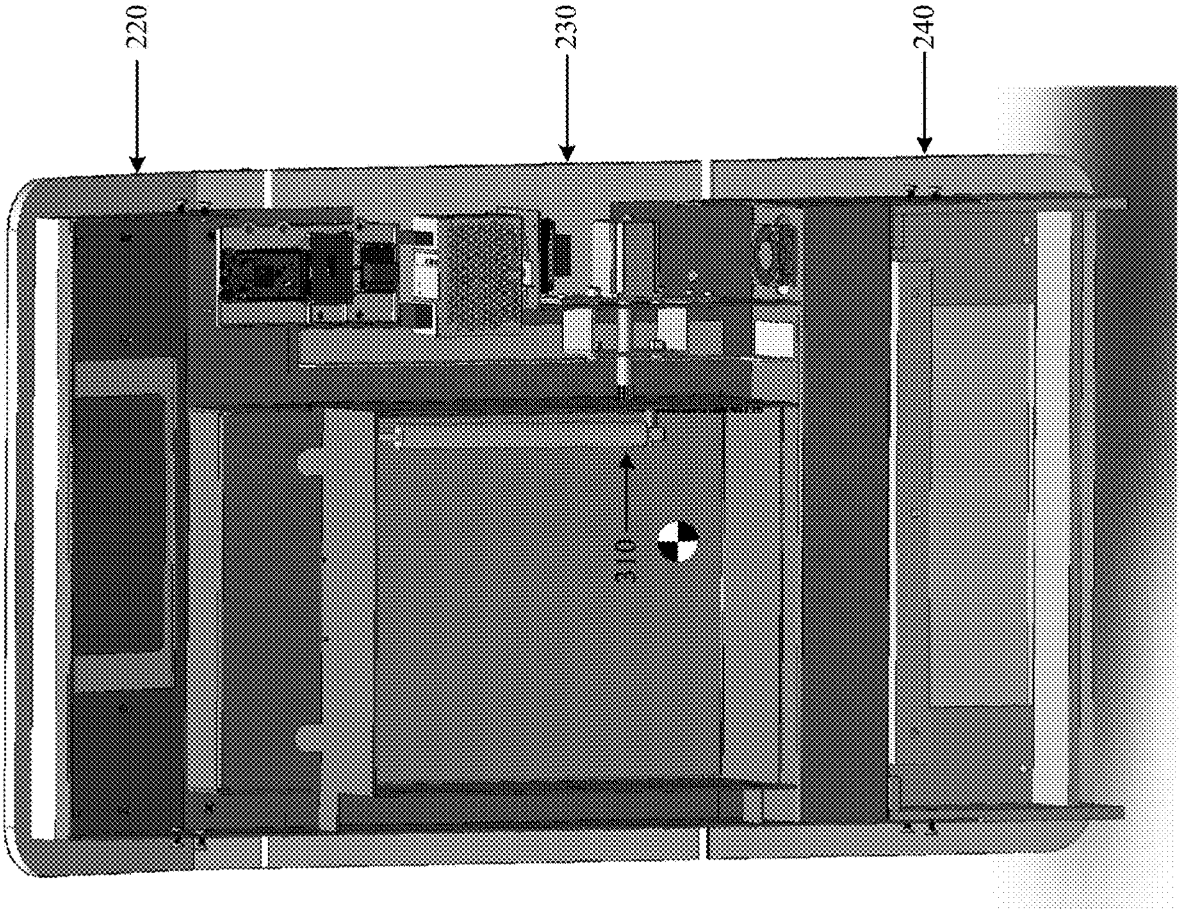
FIG. 3 shows an illustrative example of an interior portion of a waste chute device in accordance with some embodiments of the disclosed subject matter.

Fascia top sub-assembly 220 can, in some embodiments, be connected to door fascia sub-assembly 230 and fixed door panel sub-assembly 240. For example, door fascia sub-assembly 230 can be formed over waste chute door 102 that, when opened, receives items for disposal. In continuing this example, fixed door panel sub-assembly 240 can be formed adjacent to door fascia sub-assembly 230. For example, fixed door panel sub-assembly 240 may not move in connection with waste chute door 102. In another example, as shown in FIG. 3, hardware and other system portions of the waste chute device can be positioned behind fixed door panel sub-assembly 240. It should be noted that that such hardware and other system portions of the waste chute device can also be positioned behind other portions of the exterior housing (e.g., door panel 260 of fascia top sub-assembly 220 and bottom panel assembly 250).

In some embodiments, door fascia sub-assembly 220 can include a region (not shown) for the positioning of a computing device that is connected to or integrated with waste chute device 100 (e.g., a tablet computing device used to interact with waste chute device 100). For example, the region can include a window in which a display for presenting waste chute usage information to a user can be placed. In another example, the region can include an interface for connecting a computing device, such as a tablet computing device, that presents waste chute usage information.

In some embodiments, door fascia sub-assembly 230 and/or fixed door panel sub-assembly 240 can also include a handle assembly 290. For example, handle assembly 290 can be used to open and/or close waste chute door 102. In another example, handle assembly 290 can be formed on fixed door panel sub-assembly 240 but may not move in connection with waste chute door 102 as with handle assembly 290 on door fascia sub-assembly 230.

Note that, although not shown in FIGS. 1 and 2, in some embodiments, waste chute device 100 can be associated with any suitable imaging devices or sensors. For example, as described below in more detail in connection with block 908 of FIG. 9, in some embodiments, waste chute device 100 can include a camera and/or sensor(s) that capture any suitable information that can be used to identify items placed in waste chute device 100. In a more particular example, waste chute device 100 can include one or more cameras and/or sensors for capturing images of the items placed in the waste chute, where the captured images can be analyzed to determine the number of bags that a user has placed in the waste chute, the type of items that have been placed in the waste chute (e.g., organic waste, recyclable materials, etc.), the amount of a particular item that has been placed in the waste chute (e.g., an estimate of an amount of organic waste placed in the waste chute based on an image), etc. In yet another more particular example, the captured images can be analyzed to determine whether the user may be violating one or more rules or criteria (e.g., whether the user has placed more than a selected number of bags of trash in the waste chute, whether the user has placed recyclable items in a waste chute, etc.).

Figure 8:
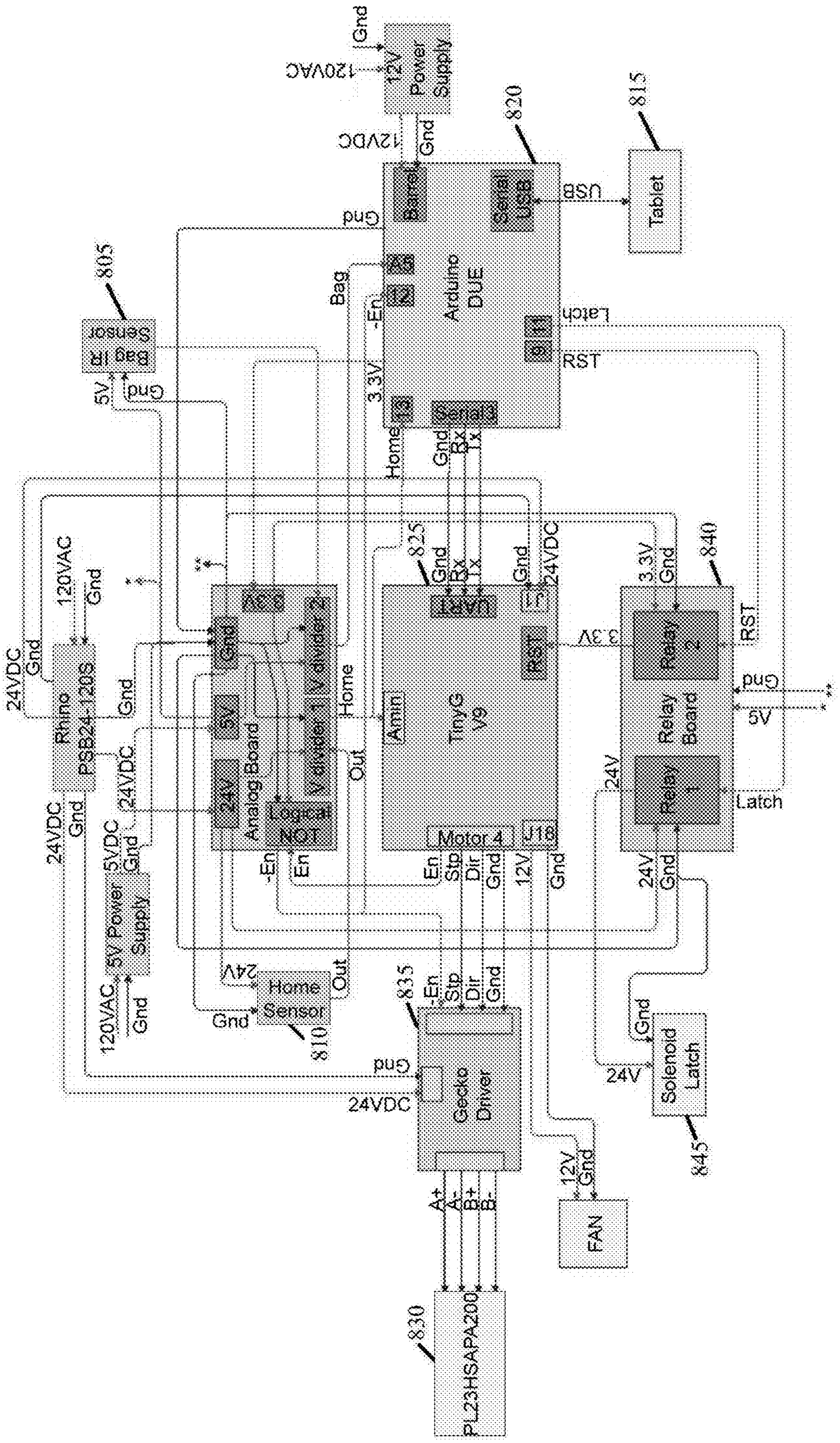
FIG. 8 shows an illustrative schematic diagram of the circuitry used in a waste chute device in accordance with some embodiments of the disclosed subject matter.

In another more particular example, waste chute device 100 can receive sensor data from a through-beam sensor that indicates the number of time a beam has been broken. For example, as shown in FIG. 8, an infrared through-beam sensor system 805 having an emitter and a receiver or any other suitable photoelectric sensors can transmit an infrared light beam across a particular portion of waste chute device 100 and can detect the number of times that the infrared light beam has been disrupted. In turn, the number of times that the infrared light beam has been disrupted can be correlated with the number of items that have been placed in waste chute device 100. In order to determine whether the user may be violating one or more rules or criteria, waste chute device 100 (or another device in which waste chute device 100 can transmit this sensor data) can compare the number of beam disruptions in a given transaction with the number of bags inputted on a user interface by the user.

In some embodiments, waste chute door 102 can be automatically opened. For example, in some embodiments, waste chute door 102 can be automatically opened in response to receiving an input from a computing device connected to or communicatively coupled to waste chute device 100 and/or waste chute door 102, as shown in and described below in connection with FIGS. 9 and 10. In some such embodiments, movement of waste chute door 102 can be controlled by any suitable motor or actuator.

In a more particular example, FIG. 3 shows an actuator system 310 that is integrated within waste chute device 100 and waste chute door 102. In continuing this example, in response to receiving an identity of the user or otherwise authenticating the user of waste chute device 100, waste chute device 100 can transmit an instruction to actuator system 310 to automatically open waste chute door 102.

In another more particular example, FIG. 8 shows an illustrative hardware schematic of the waste chute device in accordance with some embodiments of the disclosed subject matter. As shown in FIG. 8, waste chute device 100 can include a tablet computing device 815. As described herein, tablet computing device 815 can include a display that presents one or more user interfaces for interacting with waste chute device 100. In response to presenting identity information (e.g., authenticating with waste chute device 100 using a mobile device, providing a user name on tablet computing device 815, providing an apartment number on tablet computing device 815, etc.), tablet computing device 815 can transmit an instruction to one or more processing devices 820 and 825 to cause an actuator 830 (e.g., a stepper motor 830 connected to an actuator arm) to automatically open waste chute door 102. In another example, in response to determining that the user has placed the items within the opening of waste chute device 100, tablet computing device can transmit an instruction to one or more processing devices 820 and 825 to cause actuator 830 (e.g., stepper motor 830 connected to an actuator arm) to automatically close waste chute door 102.

In some embodiments, a stepper motor controller 835 can be used to transmit the instruction from a processing device (e.g., processing device 820 and/or processing device 825) to stepper motor 830.

It should be noted that, although FIG. 8 shows multiple processing devices, such as processing devices 820 and 825, this is merely illustrative. For example, in some embodiments, a single processing device can be used.

Additionally or alternatively, in some embodiments, waste chute door 102 can include an electronic interlock that controls whether waste chute door 102 is locked and prevented from being opened. For example, waste chute door 102 can, in response to receiving a suitable control signal from a computing device, cause the electronic interlock to unlock waste chute door 102 and cause the actuator to automatically open waste chute door 102 for accepting trash items. In another example, waste chute door 102 can, in response to receiving a suitable input from an input pad attached to waste chute door 102, cause waste chute device 100 to transition from a sleep state to an operational state in which waste chute door 102 is allowed to be opened by the user.

In a more particular example, FIG. 8 shows an illustrative hardware schematic of the waste chute device in accordance with some embodiments of the disclosed subject matter. As shown in FIG. 8, waste chute device 100 can include a tablet computing device 815. As described herein, tablet computing device 815 can include a display that presents one or more user interfaces for interacting with waste chute device 100. In response to presenting identity information (e.g., authenticating with waste chute device 100 using a mobile device, providing a user name on tablet computing device 815, providing an apartment number on tablet computing device 815, etc.), tablet computing device 815 can transmit an instruction to one or more processing devices 820 and 825 to cause a latching solenoid actuator 845 (e.g., via a relay board or any other suitable relay circuitry) to automatically unlatch waste chute door 102. In some embodiments, in response to presenting identity information or any other suitable information to tablet computing device 815, tablet computing device 815 can transmit a first instruction that causes latching solenoid actuator 845 to unlock or unlatch waste chute door 102 and a second instruction that causes stepper motor 830 to initiate the actuator system to open waste chute door 102 (e.g., such that trash items can be placed within an opening of waste chute device 100).

In some embodiments, in response to determining that the user has placed the items within the opening of waste chute device, tablet computing device 815 can transmit an instruction to one or more processing devices 820 and 825 to cause latching solenoid actuator 845 (e.g., via a relay board or any other suitable relay circuitry) to automatically latch or otherwise lock waste chute door 102.

It should be noted that, although FIG. 8 shows one or more power sources for providing power to one or more processing devices, one or more controller boards or other controller circuitry, one or more relay boards or other relay circuitry, one or more tablet computing devices or any other suitable computing device connected to or integrated with waste chute device 100, this is merely illustrative. For example, in some embodiments, a single power source can be used that provides power to each of the circuitry components of waste chute device 100.

Figure 5A:
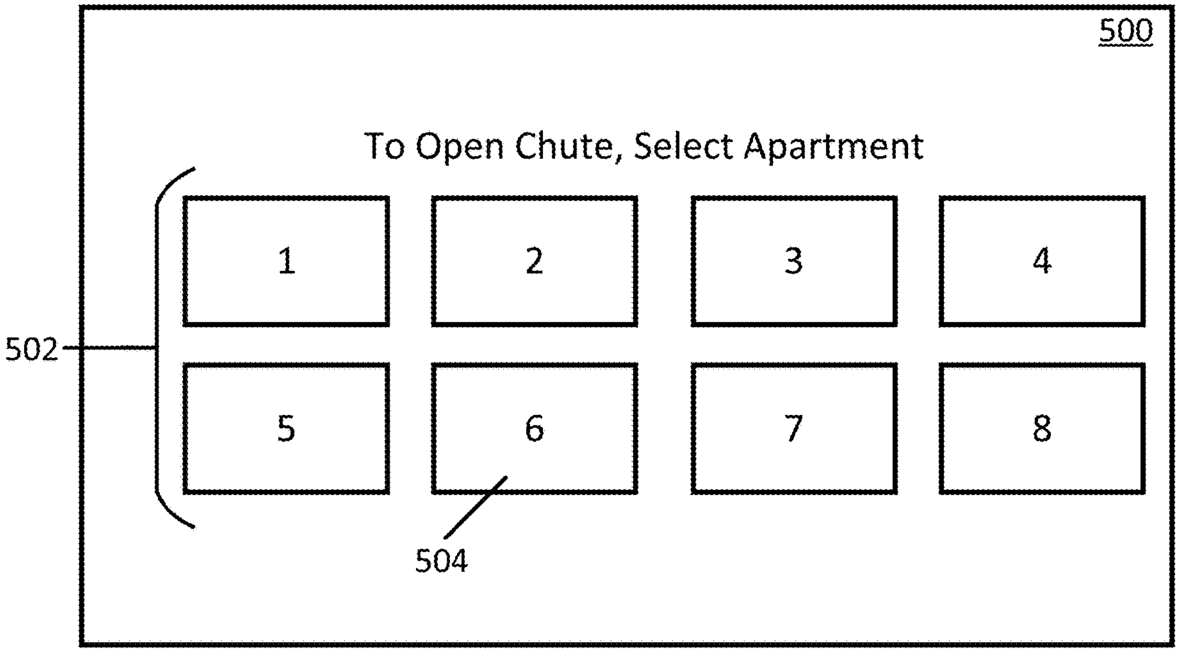
FIGS. 5A, 5B, and 5C show examples of user interfaces for operating a waste chute device in accordance with some embodiments of the disclosed subject matter.
Figure 5B:
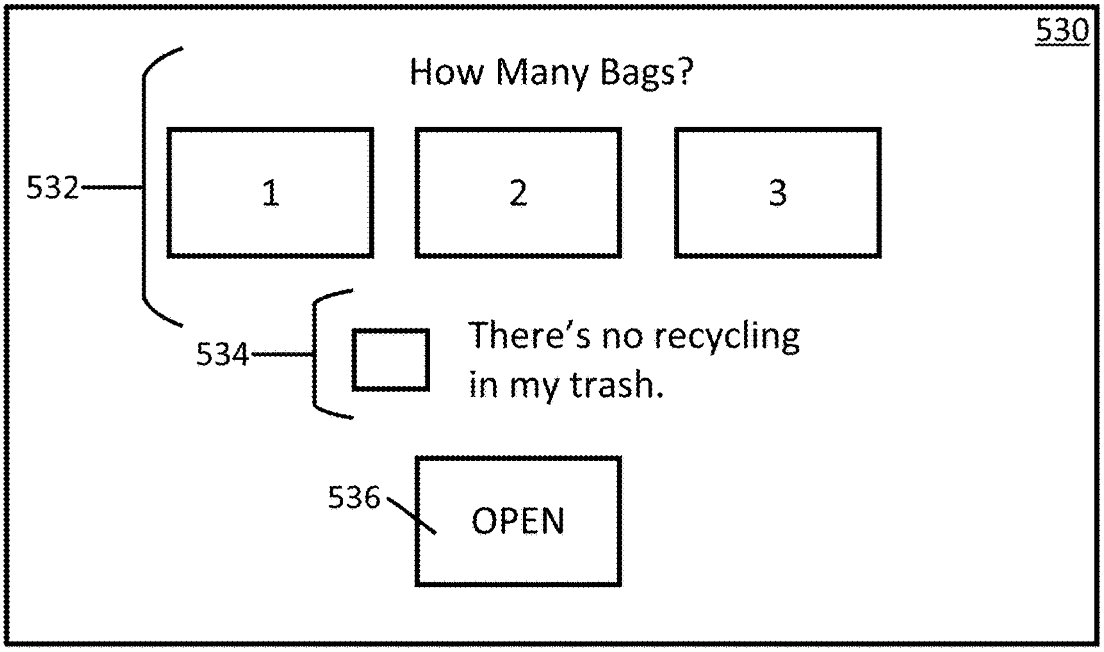
Figure 5C:
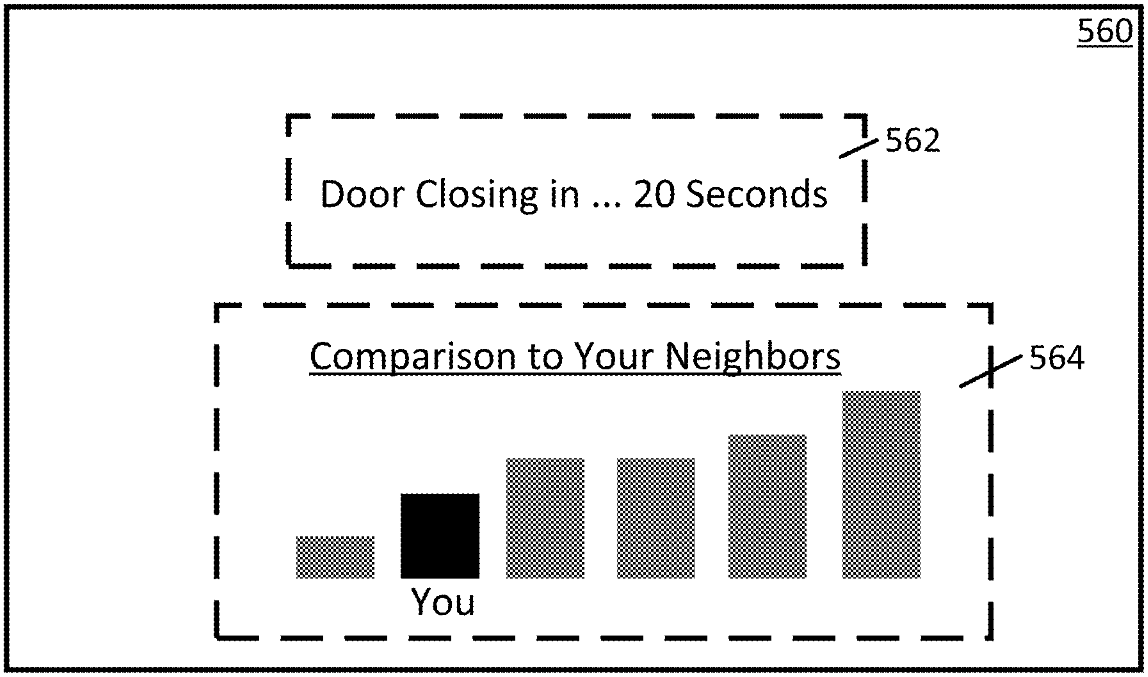

In some embodiments, operation of waste chute device 100 can be controlled via a user interface presented by a computing device (e.g., a tablet computer, a mobile phone, a monitor, and/or any other suitable computing device) that is connected to waste chute device 100. Illustrative examples of user interfaces are shown in FIGS. 5A-5C.

In some embodiments, operation of waste chute device 100 can begin by identifying a user of waste chute device 100, for example, by receiving an indication of their corresponding apartment number or other identifier. FIG. 5A shows an example 500 of a user interface for selecting an apartment number within a multi-unit building in accordance with some embodiments of the disclosed subject matter.

It should be noted that, in some embodiments, the user of waste chute device 100 can be identified using any suitable approach. For example, additionally or alternatively to selecting a user identifier, such as an apartment number, a mobile device associated with the user can connect over a communications network with waste chute device 100, where a device identifier, user account, or other suitable identifier can be used to authenticate the user of waste chute device 100. In another example, additionally or alternatively to selecting a user identifier, the user of waste chute device 100 can operate waste chute device 100 using a key fob or an access card. In continuing this example, in response to authenticating with a key fob (e.g., with a reader connected to waste chute device 100), a door of waste chute device 100 can unlock, thereby allowing the user to begin using waste chute device 100. Alternatively, in response to authenticating with a key fob (e.g., with a reader connected to waste chute device 100), the computing device can activate a selectable user interface for unlocking the door of waste chute device 100 and/or opening the door of waste chute device 100 (e.g., an "UNLOCK" button interface and/or an "OPEN" button interface on the computing device). In yet another example, alternatively to selecting a user identifier, waste chute device 100 can confirm the identity of the user by receiving an input to a key pad connected to the door of waste chute device 100, by receiving a password or a Personal Identification Number (PIN) in any suitable manner (e.g., via a touchscreen associated with a tablet computer or other device associated with waste chute device 100, and/or in any other suitable manner), by receiving a particular voice input to activate waste chute device 100 (e.g., a voice input of the apartment number, a trigger word that causes waste chute device 100 to transition to an operational state, etc.), by receiving a suitable input to a biometric scanner connected to the door of waste chute device 100, etc. Note that, in some embodiments, multiple items may be needed in combination to confirm the identity of the user such that waste chute device 100 can be used, such as a mobile device and an access card.

It should be noted that, although the embodiments described herein relate to authenticating a user prior to allowing waste chute device 100 to be used (e.g., by accessing an authentication server, by connecting with a mobile device associated with the user of waste chute device 100, etc.), this is merely illustrative. In some embodiments, waste chute device 100 can be operated without having a connection to one or more communication networks. For example, waste chute device 100 can have an offline mode in which authorized user information, such as an apartment number or a unique radio frequency identification number, is stored in waste chute device 100. In response to receiving an input (e.g., on a keypad on the door of waste chute device 100), waste chute device 100 can determine whether the received input matches authorized user information. In continuing this example, a user interface presented on a display associated with waste chute device 100 can request that the user select an apartment number from multiple apartment numbers presented on a display that is populated using the authorized user information or can instruct the user to scan a key fob to begin operating waste chute device 100.

As illustrated, user interface 500 can include a group 502 of apartment numbers. Although each apartment number is indicated as a number in FIG. 5A, in some embodiments, any other suitable apartment identifier can be used, such as a name of a resident of the apartment, a photo or icon representing a resident of the apartment, and/or any other suitable identifier. Group 502 can include any suitable number of individual apartment numbers, such as apartment indicator 504, as shown in FIG. 5A. In some embodiments, apartment indicator 504 can be a selectable input that, when selected, can cause a user interface 530 of FIG. 5B to be presented on the computing device.

In some embodiments, user interface 500 can provide an option that allows the user associated with the indicated apartment number to be presented with historical waste information. For example, user interface 500 can allow the user to be presented with historical information, such as the last time waste chute device 100 was accessed, the number of bags that the user has placed in waste chute device 100 over the past month, the amount that the user has been charged for disposing trash items in waste chute device 100, etc. As another example, in some embodiments, user interface 500 can be presented with information such as a remaining value of a waste disposal budget (e.g., "you have $5.00 remaining in your waste disposal budget," and/or any other suitable budget information).

As shown in FIG. 5B, user interface 530 can request that the user indicate an amount of waste to be placed in waste chute device 100. For example, upon identifying and/or authenticating a user of waste chute device 100, user interface 530 can include waste amount indicators 532. In some embodiments, waste amount indicators 532 can include one or more selectable inputs that can allow a user to indicate a number of bags that will be placed into waste chute device 100. Note that, in some embodiments, rather than individual selectable inputs, user interface 530 can include any other suitable user interface controls, such as a drop-down menu, radio buttons, "+" and "−" push buttons that can allow a user of user interface 530 to increase or decrease a currently set amount of waste, and/or any other suitable user interface controls.

Additionally or alternatively, in some embodiments, the number of bags placed into waste chute device 100 or the amount of trash items placed into waste chute device 100 can be detected using one or more imaging devices, scales, or other suitable sensors.

In some embodiments, user interface 530 can additionally include a selectable input to indicate that a user of user interface 530 is complying with any suitable rules. For example, as shown in FIG. 5B, user interface 530 can include a selectable input 234 that allows the user to indicate the type of trash items being placed in waste chute device 100—e.g., that there are no recyclable items included in a trash bag. In some such embodiments, the computing device can prevent waste chute door 102 from opening unless selectable input 534 is selected, thereby verifying the type of trash items to be placed in waste chute device 100.

Additionally, in some embodiments, user interface 530 can include a selectable input 236 to open waste chute door 502 (e.g., an "UNLOCK" button interface and/or an "OPEN" button interface on user interface 530). For example, in response to selecting input 536 on user interface 530 presented by the computing device, the computing device can transmit a control signal to an actuator or other suitable component that causes waste chute door 102 to open. In another example, in response to selecting input 236 on user interface 530 presented by the computing device, the computing device can transmit a first control signal to an electronic interlock that causes waste chute door 102 to unlock or unlatch and can transmit a second control signal to an actuator that causes waste chute door 102 to open for accepting the indicated number of trash items.

Turning to FIG. 5C, an illustrative example 560 of a user interface that can be presented by the computing device after the waste chute door is opened is shown in accordance with some embodiments of the disclosed subject matter. As illustrated, in some embodiments, user interface 560 can include a time indicator 562 and a user score 564.

In some embodiments, time indicator 562 can indicate a duration of time until waste chute door 102 is closed. In some embodiments, time indicator 562 can be updated in any suitable manner, for example, by updating the time at any suitable time intervals (e.g., in one-second intervals, and/or at any other suitable interval).

In some embodiments, although the user has selected a number of bags for placing into waste chute device 100 and/or a type of trash items placed into waste chute device 100 (e.g., no recyclables), the image devices and/or sensors connected to waste chute device 100 can, during the duration of time that waste chute door remains open, detect the number of bags that have been placed into waste chute device 100 and/or the type of trash items placed into waste chute device 100. For example, as mentioned above, an infrared beam-through sensor can emit an infrared light signal within an opening of waste chute device 100, where the number of infrared beam disruptions can be correlated with a number of items placed into waste chute device 100. This number of items detected using the infrared beam-through sensor can be compared with the number of bags or items indicated on the user interface of the computing device.

In some embodiments, user score 564 can indicate a score or other metric associated with the user. For example, in some embodiments, user score 564 can indicate a total number of bags of trash thrown away by the user over any suitable time period (e.g., in the past week, in the past month, in the past year, and/or any other suitable time period), an average number of bags of trash thrown away by the user over any suitable time period, a total amount of money the user has paid to throw away trash over any suitable time period, and/or any other suitable metric. As another example, in some embodiments, user score 564 can indicate a score or metric associated with the user relative to other users, such as neighbors or other building occupants. As a more particular example, as shown in FIG. 5C, user score 564 can include a graph that indicates a score or metric associated with the user (e.g., total number of bags thrown away in the past week, and/or any other suitable metric) in comparison with corresponding scores or metrics for other users. As a further example, user score 564 can include a score or metric associated with the user that shows this number of items detected using the infrared beam-through sensor in this transaction and historical transactions in comparison with the number of bags or items indicated on the user interface of the computing device in this transaction and historical transactions.

It should be noted that, although the embodiments described herein generally relate to a user associated with an apartment in a multi-unit dwelling, this is merely illustrative. For example, the user can be a member of a household and waste chute device 100 can determine a score or metric associated with the user in comparison to other members of the particular household. In another example, the user can be a member of an organization and waste chute device 100 can determine a score or metric associated with the user in comparison to other members of the particular organization.

It should also be noted that, in some embodiments, the number of bags of trash, the type of trash items placed in waste chute device 100, user scores or metrics, and/or other suitable information can be transmitted to an administrative user. For example, a superintendent user of a multi-unit dwelling can receive such information to determine a waste output of the multi-unit dwelling, a waste output of a particular floor in the multi-unit dwelling in comparison with other floors, etc. In another example, such information can be analyzed such that a superintendent users of a multi-unit dwelling can receive a notification as to frequency of disposal (e.g., particular times of the day, days of the week, etc.), a notification as to whether current waste output for a particular floor in the multi-unit dwelling is being received at higher than the average waste output for that floor, etc.

In a more particular example, additionally or alternatively to presenting information relating to the use of waste chute device 100 to the user (e.g., the user interfaces shown in FIGS. 5A through 5C), waste chute device 100 can be integrated with a building management system.

Such a building management system can, for example, be used to identify users or residential units within a building. In continuing the example above, waste chute device 100 can communicate with the building management system to determine whether the user is authorized to operate waste chute device 100 based on the inputted identification information. In another example, building management system can transmit apartment unit information for presentation on a display associated with a waste chute located on a particular floor. This can, for example, eliminate the need for the user of waste chute device 100 to interact with waste chute device 100 via interfaces, such as those shown in FIGS. 5A through 5C.

In some embodiments, a building management system can be used to transmit information to a user of waste chute device 100. For example, in response to operating waste chute device 100 to dispose of one or more trash items, waste chute device 100 can communicate the number of bags of trash, the type of trash items placed in waste chute device 100, user scores or metrics, and/or other suitable information to the building management system. The building management system can, in turn, aggregate and communicate information relating to use of waste chute device 100 (or multiple waste chutes located in a building) by the user or by the apartment unit. For example, a weekly email communicating such aggregated information can be transmitted.

In some embodiments, a building management system can include additional sensors (e.g., presence sensors, camera device, etc.) and can combine sensor information from one or more of these sensors with information relating to the use of waste chute device 100. For example, a building administrator can review imaging information from a trash room camera connected to the building management system and combine this imaging information with the information relating to the use of waste chute device 100. In another example, the imaging information from a trash room camera connected to the building management system can be combined with imaging information from a camera integrated within waste chute device 100. This can allow a building administrator to, for example, verify whether a user is properly using waste chute device 100, verify whether a user using waste chute device 100 is violating one or more building policies, verify the types of trash items that the user is placing into waste chute device 100, etc.

In some embodiments, image information and other data captured by the image device and/or sensors connected to waste chute device 100 can be associated with the trash transaction and transmitted to a superintendent user of waste chute device 100. For example, the superintendent user can review image information captured by an image device placed within waste chute device 100 to determine whether the user in that trash transaction complied with particular rules and/or policies. In another example, the superintendent user can review image information by an image device positioned to capture the user using waste chute device 100 to determine whether the user is properly using waste chute device 100 (e.g., properly recording the number of bags, placing the appropriate trash items into waste chute device 100, etc.).

Figure 6:
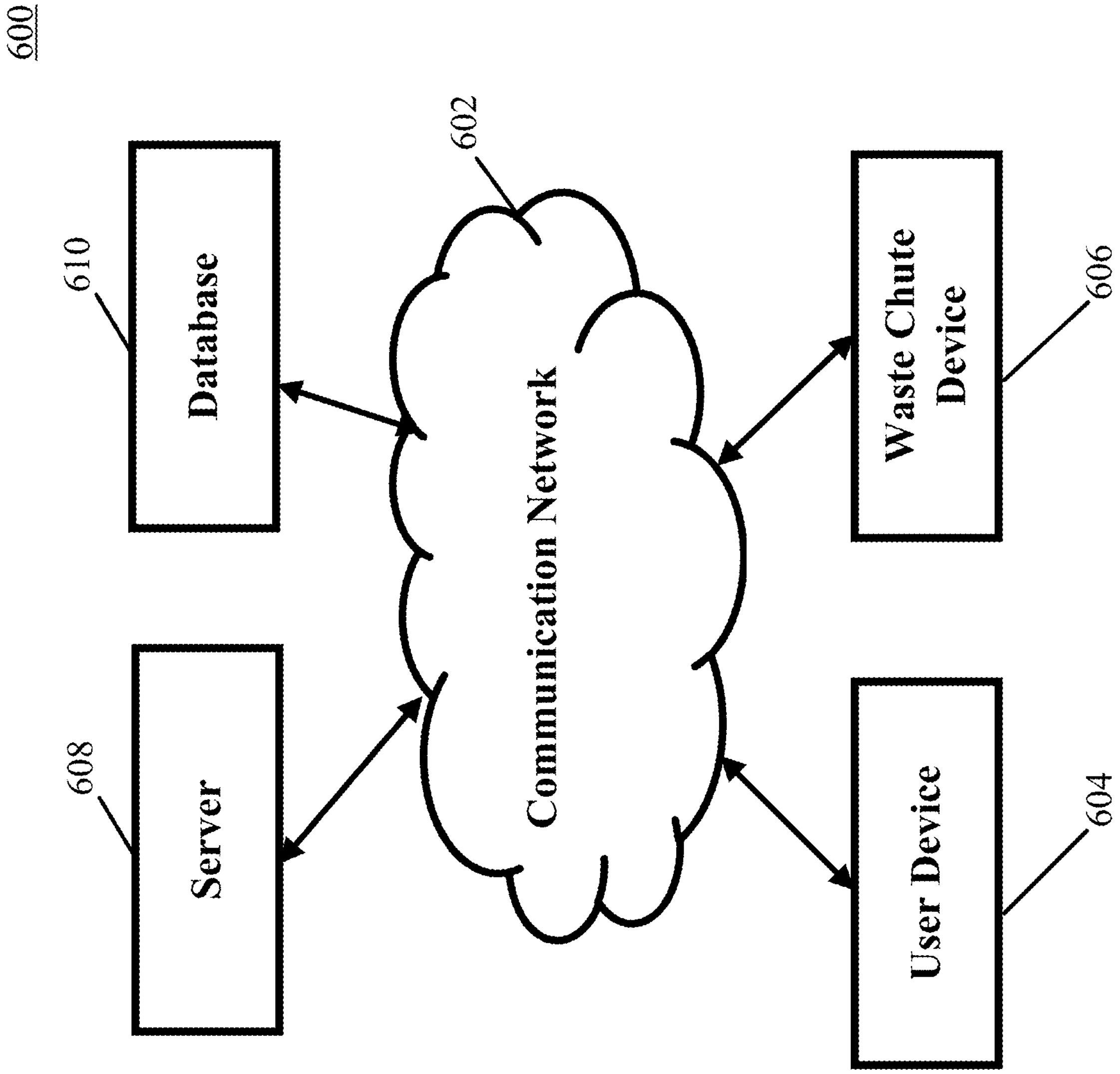
FIG. 6 shows a schematic diagram of an illustrative system suitable for implementation of mechanisms described herein for operating a waste chute device in accordance with some embodiments of the disclosed subject matter.

Turning to FIG. 6, an illustrative example 600 of hardware for operating a waste chute that can be used in accordance with some embodiments of the disclosed subject matter is shown. As illustrated, hardware 600 can include a communication network 602, a computing device 604, a waste chute device 606, a server 608, and/or a database 610.

Communication network 602 can be any suitable combination of one or more wired and/or wireless networks in some embodiments. For example, communication network 602 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. Computing device 604 and waste chute device 606 can be connected by one or more communications links to communication network 602, which can be connected by one or more communications links to server 608 and/or database 610. The communications links can be any communications links suitable for communicating data among computing device 604 and waste chute device 606 such as network links, dial-up links, wireless links, hard-wired links, any other suitable communications links, or any suitable combination of such links.

It should be noted that, in some embodiments, waste chute device 606 may not communicate information using communication network 602. For example, waste chute device 606 can operate in an offline mode in which authorized user information, such as an apartment number or a unique radio frequency identification number, is stored in waste chute device 606 and, in response to receiving an identifier or other input information, can verify whether the identifier matches authorized user information stored in waste chute device 606. In continuing this example, a user interface presented on a display associated with waste chute device 606 can request that the user input an apartment number or can instruct the user to scan a key fob to begin operating waste chute device 606.

Computing device 604 can include any one or more computing devices suitable for operating a waste chute, determining or monitoring information associated with items placed in the waste chute, and/or any other suitable functions. For example, in some embodiments, computing device 604 can include a mobile device, such as a mobile phone, a tablet computer, a laptop computer, and/or any other suitable mobile device. As another example, in some embodiments, computing device 604 can include a non-mobile device, such as a desktop computer, and/or any other suitable non-mobile device.

Waste chute device 606 can be any suitable system for receiving waste (e.g., garbage bags, recycling bags, individual items, and/or any other suitable items) and funneling the received waste to a trash bin, recycling bin, dumpster, or other receptacle. For example, as shown in FIG. 1, waste chute device 606 can have a door that opens to allow a user to place waste in the chute. In some embodiments, operation of the door can be controlled by computing device 604, as shown in and described below in connection with FIG. 5. In some embodiments, the waste chute door can be controlled by any suitable device, such as an actuator that causes the door to open or close in response to receiving a control signal. Additionally, in some embodiments, the waste chute door can have an electronic lock that causes the door to remain closed unless unlocked (e.g., in response to receiving a control signal).

Server 608 can be any suitable server for storing information related to waste chute device 606, such as information indicating an amount of waste disposed by particular users of waste chute device 606 over any suitable time period, data corresponding to historical information indicating waste previously disposed by particular users of waste chute device 606, and/or any other suitable information. In some embodiments, server 608 can process any suitable fees associated with waste disposal. For example, in instances where disposing of waste is associated with a particular fee (e.g., a particular amount per bag of waste, a particular amount per pound of waste, and/or any other suitable fee), server 608 can facilitate a charge to a user account associated with a user of waste chute device 606. As a more particular example, in some embodiments, server 608 can update a payment account by debiting the payment account by an amount corresponding to the charge, and/or process the payment in any other suitable manner. Note that, in some embodiments, server 608 can be associated with any suitable entity, such as an administrator or super of a building in which waste chute device 606 is located, an organization or business that administers or services waste chute device 606, and/or any other suitable entity. Note that, in some embodiments, server 608 can be omitted.

Database 610 can be any suitable database for storing information related to use of waste chute device 606. For example, in some embodiments, database 610 can store information indicating an amount of waste disposed by particular users. As a more particular example, as described above in connection with FIGS. 5A-5C, a user associated with a particular apartment number can use waste chute device 606 to dispose of a particular amount of waste, and database 610 can update an amount of waste disposed of by the user and/or by all residents of the particular apartment number based on the amount of waste disposed of. In some such embodiments, database 610 can store information over any suitable time period (e.g., for a week, for a month, for a year, indefinitely, and/or any other suitable time period), and can provide aggregated information indicating waste disposed of by the user or by the apartment over any suitable time period (e.g., an aggregate amount of waste disposed of over the past month, and/or any other suitable time period). In some embodiments, database 610 can provide information indicating waste disposal metrics associated with waste chute device 606 in response to a query. For example, a query to database 610 can request an amount of waste disposed of by a particular resident of a building, by all residents of a building, by residents of a particular floor of a building, and/or any other suitable users of waste chute device 606 over any suitable time period. Note that, in some embodiments, database 610 can receive information from multiple waste chute devices. Additionally, note that, in some embodiments, database 610 can be stored in memory of server 608. In some embodiments, database 610 can be omitted. In some such embodiments, information indicating amounts of waste disposed and/or any other suitable information can be stored directly on computing device 604 and/or on waste chute device 606.

In some embodiments, waste chute device 606 can include any suitable components for processing the received trash items. For example, waste chute device 606 can include a trash compactor or trash disposal that grinds and/or compresses received trash items. In another example, waste chute device 606 can include components for sanitizing received trash items. In yet another example, waste chute device 606 can include components for sorting received trash items (e.g., solid waste from recyclable containers, sorting out organic waste for composting, etc.). As described herein, fees and/or incentives for disposing these trash items can be based on the sorted trash items.

Although one computing device 604 and one waste chute device 606 are shown in FIG. 3 to avoid over-complicating the figure, any suitable number of computing devices, and/or any suitable types of computing devices, can be used in some embodiments.

Figure 7:
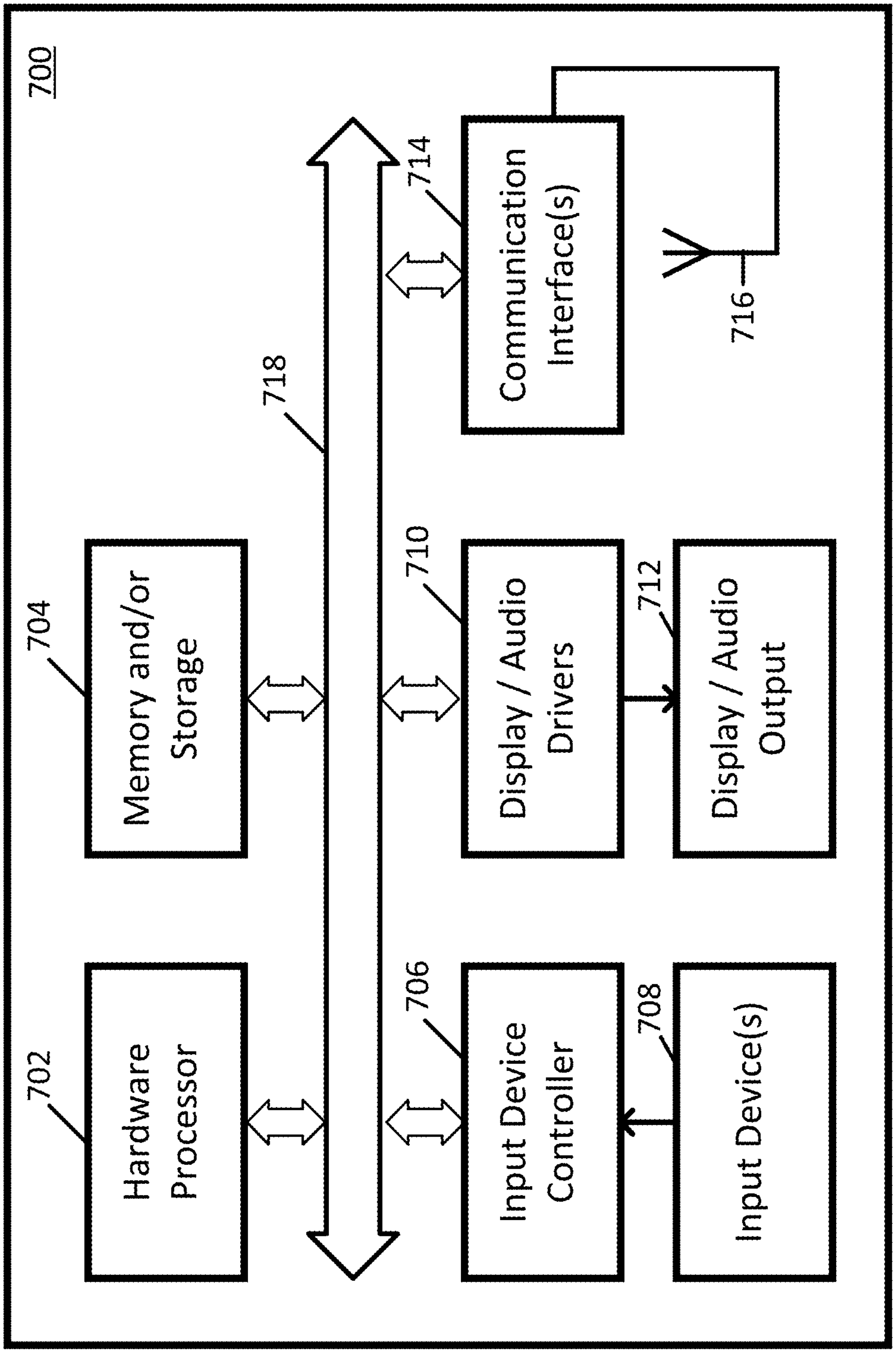
FIG. 7 shows a detailed example of hardware that can be used in a computing device of FIG. 6 in accordance with some embodiments of the disclosed subject matter.

Computing device 604, server 608, and/or database 610 can be implemented using any suitable hardware in some embodiments. For example, in some embodiments, devices 604, 608, and/or 610 can be implemented using any suitable general purpose computer or special purpose computer. For example, a mobile phone may be implemented using a special purpose computer. Any such general purpose computer or special purpose computer can include any suitable hardware. For example, as illustrated in example hardware 700 of FIG. 7, such hardware can include hardware processor 702, memory and/or storage 704, an input device controller 706, an input device 708, display/audio drivers 710, display and audio output circuitry 712, communication interface(s) 714, an antenna 716, and a bus 718.

Hardware processor 702 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 702 can be controlled by a computer program stored in memory and/or storage 704 of computing device 604. For example, the computer program can cause hardware processor 702 to detect that a user of computing device 604 has selected an input to open waste chute device 606, to determine information associated with items placed in waste chute device 606, to cause a door of waste chute device 606 to close, to update information associated with a user of waste chute device 606, and/or perform any other suitable actions.

Memory and/or storage 704 can be any suitable memory and/or storage for storing programs, data, and/or any other suitable information in some embodiments. For example, memory and/or storage 704 can include random access memory, read-only memory, flash memory, hard disk storage, optical media, and/or any other suitable memory.

Input device controller 706 can be any suitable circuitry for controlling and receiving input from one or more input devices 708 in some embodiments. For example, input device controller 706 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 710 can be any suitable circuitry for controlling and driving output to one or more display/audio output devices 712 in some embodiments. For example, display/audio drivers 710 can be circuitry for driving a touchscreen, a flat-panel display, a cathode ray tube display, a projector, a speaker or speakers, and/or any other suitable display and/or presentation devices.

Communication interface(s) 714 can be any suitable circuitry for interfacing with one or more communication networks, such as network 602 as shown in FIG. 6. For example, interface(s) 714 can include network interface card circuitry, wireless communication circuitry, and/or any other suitable type of communication network circuitry.

Antenna 716 can be any suitable one or more antennas for wirelessly communicating with a communication network (e.g., communication network 602) in some embodiments. In some embodiments, antenna 716 can be omitted.

Bus 718 can be any suitable mechanism for communicating between two or more components 602, 604, 606, 610, and 614 in some embodiments.

Any other suitable components can be included in hardware 700 in accordance with some embodiments.

As described herein, an illustrative schematic diagram of the circuitry components within waste chute device 606 is shown in FIG. 8.

For example, as shown in FIG. 8, waste chute device 606 can receive sensor data from any suitable sensors. For example, as shown in FIG. 8, an infrared through-beam sensor system 805 having an emitter and a receiver or any other suitable photoelectric sensors can transmit an infrared light beam across a particular portion of waste chute device 100 and can detect the number of times that the infrared light beam has been disrupted. In turn, the number of times that the infrared light beam has been disrupted can be correlated with the number of items that have been placed in waste chute device 606. In order to determine whether the user may be violating one or more rules or criteria, waste chute device 606 (or another device in which waste chute device 606 can transmit this sensor data) can compare the number of beam disruptions in a given transaction with the number of bags inputted on a user interface by the user.

In another example, as shown in FIG. 8, waste chute device 606 can include a tablet computing device 815 or any other suitable computing device. As described herein, tablet computing device 815 can include a display that presents one or more user interfaces for interacting with waste chute device 606. In response to presenting identity information (e.g., authenticating with waste chute device 606 using a mobile device 604, providing a user name on tablet computing device 815, providing an apartment number on tablet computing device 815, etc.), tablet computing device 815 can transmit an instruction to one or more processing devices 820 and 825 to cause an actuator 830 (e.g., a stepper motor 830 connected to an actuator arm) to automatically open the waste chute door. In response to determining that the user has placed the items within the opening of waste chute device 100, tablet computing device can transmit an instruction to one or more processing devices 820 and 825 to cause actuator 830 (e.g., stepper motor 830 connected to an actuator arm) to automatically close waste chute door 102.

In some embodiments, a stepper motor controller 835 can be used to transmit the instruction from a processing device (e.g., processing device 820 and/or processing device 825) to stepper motor 830.

It should be noted that waste chute device 606 can include any suitable components to control the actuator system, such as an instruction from tablet computing device 815 to a microcontroller 820, where microcontroller 820 transmits the instruction to CNC controller 825, CNC controller 820 transmits the instruction to stepper motor controller 835, stepper motor controller 835 transmits the instruction to stepper motor 830, and stepper motor 830 causes the actuator system to open the waste chute door.

In a further example, as shown in FIG. 8, waste chute device 606 can include any suitable electronic lock. In a more particular example, in response to presenting identity information (e.g., authenticating with waste chute device 606 using a mobile device 604, providing a user name on tablet computing device 815, providing an apartment number on tablet computing device 815, etc.), tablet computing device 815 can transmit an instruction to one or more processing devices 820 and 825 to cause a latching solenoid actuator 845 (e.g., via a relay board 840 or any other suitable relay circuitry) to automatically unlatch the waste chute door. In some embodiments, in response to presenting identity information or any other suitable information to tablet computing device 815, tablet computing device 815 can transmit a first instruction that causes latching solenoid actuator 845 to unlock or unlatch the waste chute door and a second instruction that causes stepper motor 830 to initiate the actuator system to open the waste chute door (e.g., such that trash items can be placed within an opening of waste chute device 606.

In some embodiments, in response to determining that the user has placed the items within the opening of waste chute device, tablet computing device 815 can transmit an instruction to one or more processing devices 820 and 825 to cause latching solenoid actuator 845 (e.g., via a relay board or any other suitable relay circuitry) to automatically latch or otherwise lock waste chute door 102.

It should be noted that, although FIG. 8 shows multiple processing devices, such as processing devices 820 and 825, this is merely illustrative. For example, in some embodiments, a single processing device can be used.

It should also be noted that, although FIG. 8 shows one or more power sources for providing power to one or more processing devices, one or more controller boards or other controller circuitry, one or more relay boards or other relay circuitry, one or more tablet computing devices or any other suitable computing device connected to or integrated with waste chute device 100, this is merely illustrative. For example, in some embodiments, a single power source can be used that provides power to each of the circuitry components of waste chute device 100.

Figure 9:
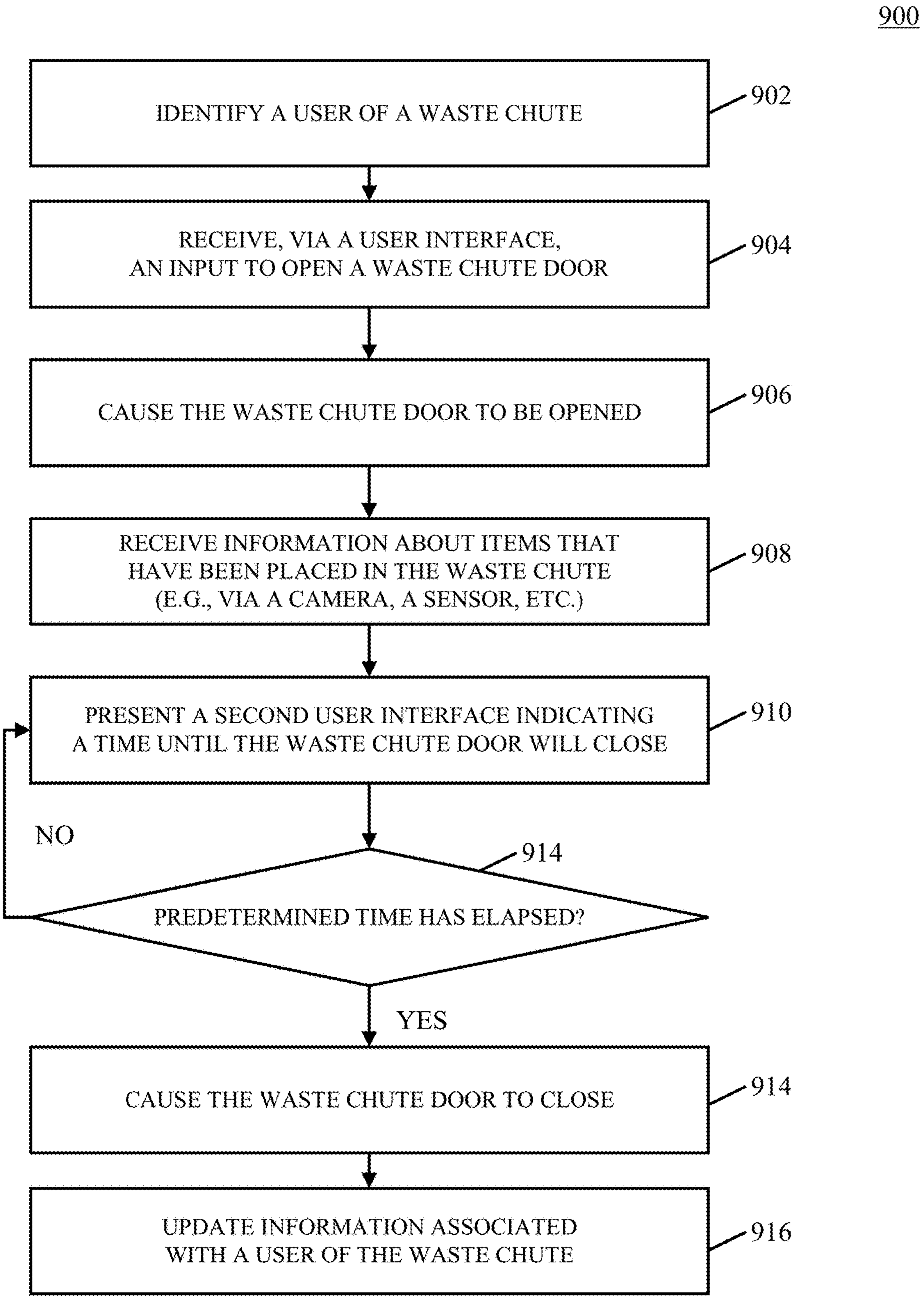
FIG. 9 shows an example of a process for operating a waste chute device in accordance with some embodiments of the disclosed subject matter.

Turning to FIG. 9, an illustrative example 900 of a process for operating a waste chute is shown in accordance with some embodiments of the disclosed subject matter. In some embodiments, blocks of process 900 can be executed on a computing device (e.g., a tablet computer or mobile phone) that is associated with the waste chute.

Process 900 can begin at 902 by identifying a user of the waste chute. For example, in some embodiments, the identification can be received via a user interface presented by a computing device, such as user interface 200 shown in and described above in connection with FIG. 5A. As a more particular example, in some embodiments, the user interface can request that the user enter an apartment number, the user's name, an identification number associated with the user, and/or any other suitable identifier. As another example, in some embodiments, process 900 can identify the user based on any other suitable information, such as by identifying a mobile device carried by the user, based on a fingerprint or other biometric information provided by the user, and/or in any other suitable manner.

At 904, process 900 can receive an input to open a waste chute door. For example, in some embodiments, the input can be received via a user interface such as user interface 230 as shown in and described above in connection with FIG. 5B. In some embodiments, process 900 can additionally receive any other suitable information. For example, as shown in and described above in connection with FIG. 5B, process 900 can receive information indicating a number of bags or a number of items the user intends to place in the waste chute, a confirmation from the user that the bags are free of items that can be recycled or composted, and/or any other suitable information.

At 906, process 900 can cause the waste chute door to open. In some embodiments, process 900 can cause the waste chute door to be opened using any suitable technique or combination of techniques. For example, in some embodiments, in response to determining that the user has provided any required confirmations (e.g., that the bag(s) do not contain recyclable items, and/or any other suitable confirmations) and in response to determining that the user has selected an input to open the door, process 900 can provide any suitable input(s) or control signal(s) to an electronic latch associated with the waste chute door that cause the electronic latch to unlock. As another example, in some embodiments, process 900 can provide any suitable input(s) or control signal(s) to an actuator (e.g., a linear actuator, and/or any other suitable actuator) that controls an opening and closing mechanism associated with the waste chute door.

At 908, process 900 can receive information about items that have been placed in the waste chute. In some embodiments, process 900 can receive information from any suitable source. For example, in some embodiments, process 900 can receive information from a camera, imaging device, or other sensor positioned within the waste chute. As a more particular example, in some embodiments, a camera placed in the waste chute can capture images of the one or more items that are placed in the waste chute, which can be used by process 900 (using any suitable computer vision and/or image recognition techniques) to determine identities of the items. As a specific example, in some embodiments, process 900 can determine, based on images captured by the camera, whether items placed in the waste chute are bagged appropriately (e.g., in bags of a particular color, in bags of a particular size, and/or according to any other suitable criteria), whether particular items that are not allowed have been placed in the waste chute (e.g., medicine bottles, electronic items, and/or any other suitable items), and/or any other suitable information. As another example, in some embodiments, process 900 can receive information from a scale or other sensor (e.g., an accelerometer, and/or any other suitable sensor) placed in the waste chute. As a more particular example, process 900 can receive information from the scale or sensor to determine a weight of item(s) placed in the waste chute to determine whether the item(s) exceed a predetermined weight threshold. In some embodiments, process 900 can determine whether the item(s) placed in the waste chute violate any suitable criteria (e.g., not appropriately bagged, include non-allowed items, exceed a weight limit, and/or any other suitable criteria) and, in response to determining that the item(s) violate the criteria, can present a message via the computing device indicating the violation. In some embodiments, process 900 can determine whether the item(s) that the user identified as being placed in the waste chute (e.g., two bags of non-recyclables items) correspond with the weight measurements, analyzed image information relating to the type of trash items, analyzed image information relating to the color of the bags being placed in the waste chute, etc.

Note that, in some embodiments, process 900 can receive image data or video data from a camera located in a room containing the waste chute that has a view of the user of the waste chute and/or of items placed in the waste chute. In some such embodiments, process 900 can analyze the image data or video data to determine whether the user is violating any suitable rules or criteria, such as placing recyclable items in a waste chute, placing more bags in the waste chute than were indicated by the user, and/or any other suitable rules. Additionally, in some embodiments, process 900 can use the image data or video data to verify the identity of the user, for example, to determine whether the user operating the waste chute corresponds to an apartment number received at block 902.

Process 900 can present a second user interface at 910 that indicates a time until the waste chute door will close. For example, as shown in and described above in connection with user interface 260 of FIG. 5C, the second user interface can indicate a number of seconds that remain until the door is closed (e.g., using an actuator connected to the waste chute door). In some such embodiments, the indicated time can be updated in any suitable manner (e.g., in one-second increments, and/or in any other suitable manner). Additionally, as shown in user interface 260 of FIG. 5C, process 900 can indicate a score or metric associated with the user and/or a score or metric associated with the user in comparison to other users. For example, in some embodiments, process 900 can indicate a total amount of trash thrown away by the user over any suitable time period (e.g., in the past week, in the past month, in the past year, and/or any other suitable time period), an average amount of trash thrown away by the user over any suitable time period, and/or any other suitable metric indicating amount of trash. As another example, in some embodiments, process 900 can indicate a number of violations (e.g., a number of times trash was not correctly bagged, a number of times the user included recyclable items in trash, and/or any other suitable violations) of rules by the user over any suitable time period. In some embodiments, the score or metric corresponding to the user can be presented in connection with scores or metrics for other users (e.g., neighbors or other building occupants, and/or any other suitable users). For example, as shown in and described above in connection with FIG. 5C, process 900 can cause a graph to be presented that indicates an amount of trash thrown away by the user in comparison to other users.

Note that, in instances where the user is charged for trash placed in the waste chute, process 900 can additionally or alternatively present an indication of the amount to be charged to the user. In some such embodiments, the amount can be calculated based on any suitable information, such as a number of bags placed in the waste chute (e.g., as indicated by the user via a user interface, as determined by process 900 based on camera or sensor information, and/or determined in any other suitable manner), a total weight of items placed in the waste chute (e.g., determined by a scale or other sensor), and/or any other suitable information. Additionally or alternatively, in some embodiments, process 900 can calculate any suitable fines associated with violations of rules detected by process 900. For example, in some embodiments, process 900 can calculate a fine associated with exceeding a weight limit, a fine associated with using bags of an incorrect color, and/or any other suitable fines.

At 912, process 900 can determine whether a predetermined duration of time has elapsed, after which the waste chute door is to be closed. In some embodiments, the predetermined duration of time can be any suitable length (e.g., five seconds, ten seconds, twenty seconds, and/or any other suitable duration). In some embodiments, the predetermined duration of time or the amount of time remaining in the predetermined duration of time can be indicated in the second user interface described above in connection with block 910.

If, at 912, process 900 determines that the predetermined duration of time has not elapsed ("no" at 912), process 900 can loop back to 910 and continue presenting the second user interface. In some such embodiments, process 900 can update a time indicated on the second user interface.

If, at 912, process 900 determines that the predetermined duration of time has elapsed ("yes" at 912), process 900 can proceed to block 914 and can cause the waste chute door to close. Process 900 can cause the waste chute door to close using any suitable technique or combination of techniques. For example, in some embodiments, process 900 can transmit a control signal to an actuator associated with the waste chute door that causes the waste chute door to be closed. As another example, in some embodiments, process 900 can transmit a control signal to an electronic latch associated with the waste chute door that causes an electronic lock associated with the waste chute door to lock.

Note that, in some embodiments, a sensor associated with the waste chute door can determine whether there is any resistance to the closing of the door while the door is being closed. For example, in some embodiments, process 900 can determine based on data from the sensor that an object (e.g., an item placed in the chute, an arm of the user, and/or any other suitable object) is blocking the door from closing. In some embodiments, in response to determining that the object is blocking the door, process 900 can inhibit the door from closing further. For example, in some embodiments, process 900 can transmit control signals to the actuator that stop motion of the door or intended motion of the door. As another example, in some embodiments, process 900 can transmit control signals to the actuator that cause the door to open. Additionally, note that, in some embodiments, process 900 can control any other suitable safety features associated with the waste chute door. For example, in some embodiments, process 900 can cause the waste chute door to be closed in response to determining that a fire alarm or smoke detector has been activated.

Additionally, note that, in some embodiments, process 900 can cause any other suitable information to be presented, for example, after the waste chute door is closed. For example, in some embodiments, process 900 can present a user interface that requests that the user rate their experience using the waste chute. As another example, in some embodiments, process 900 can present a user interface that allows the user to request that any suitable information be emailed or messaged to them (e.g., scores or metrics associated with the user, a payment charged to a user account associated with the user, a reward credited to a user account associated with the user, and/or any other suitable information). Additionally or alternatively, in some embodiments, process 900 can cause the information to be automatically emailed or messaged to the user without receiving an explicit request from the user.

At 916, process 900 can update information associated with the user of the waste chute. For example, in some embodiments, process 900 can update a running tally of a number of bags of trash the user has thrown away based on the number of bags placed in the waste chute. As another example, in some embodiments, process 900 can update a running tally of a number of violations of rules by the user based on any detections of violations by process 900. As yet another example, in some embodiments, process 900 can update an amount of money paid by the user to dispose of the trash.

In some embodiments, process 900 can charge the user any suitable amount. For example, in some embodiments, process 900 can charge the user a payment based on a number of bags thrown away or a weight of items thrown away and can facilitate payment of the amount based on a user account associated with the user or in any other suitable manner. Additionally or alternatively, in some embodiments, process 900 can calculate any suitable incentives and can deposit the incentives in the associated user account. For example, in instances where the user has thrown away fewer than a predetermined number of bags over a particular time period (e.g., over the past week, and/or any other suitable time period), process 900 can determine a reward and can credit the reward to the user account. As another example, in instances where the waste chute includes a separate chute for recyclable items or organic matter (e.g., food scraps, and/or any other suitable organic matter), process 900 can determine whether the user has recycled items or used the organic matter chute and can determine a corresponding reward to be credited to the user account.

Note that, in some embodiments, the waste chute can be used for multiple types of waste, such as trash, recycling, and/or organic matter. In some such embodiments, the waste chute can have different doors corresponding to different types of waste and/or different chute corresponding to each type of waste. In some embodiments, process 900 can use any suitable technique to determine whether a user is depositing a particular type of waste in an incorrect chute. For example, in some embodiments, process 900 can determine based on images captured from a camera (e.g., a camera placed in a chute, a camera placed in a room containing the waste chute that has a view of the waste chute, and/or any other suitable camera) whether a user has placed trash in a recycling chute, organic matter in a waste chute, and/or any other suitable violation. In some such embodiments, the determination can allow process 900 to present a message indicating the violation and/or cause a penalty fee to be charged to a user account associated with the user.

Additionally or alternatively, in some embodiments, the waste chute can have a single chute for receiving multiple types of waste and can use any suitable technique(s) to sort the waste into different containers based on type. For example, in some embodiments, process 900 can use data captured from a camera to identify recyclable materials (e.g., plastic bottles, cans, newspapers or other paper products, and/or any other suitable recyclable materials) or organic matter and can funnel the identified materials to separate bins. As another example, in some embodiments, process 900 can identify recyclable materials and/or organic matter based on any other suitable information, such as weight information received from a scale. Additionally, in some embodiments, in instances where organic matter is separated to a separate chute and/or bin, the waste chute can include any suitable processor for the organic matter, such as an anaerobic digester.

Figure 10:
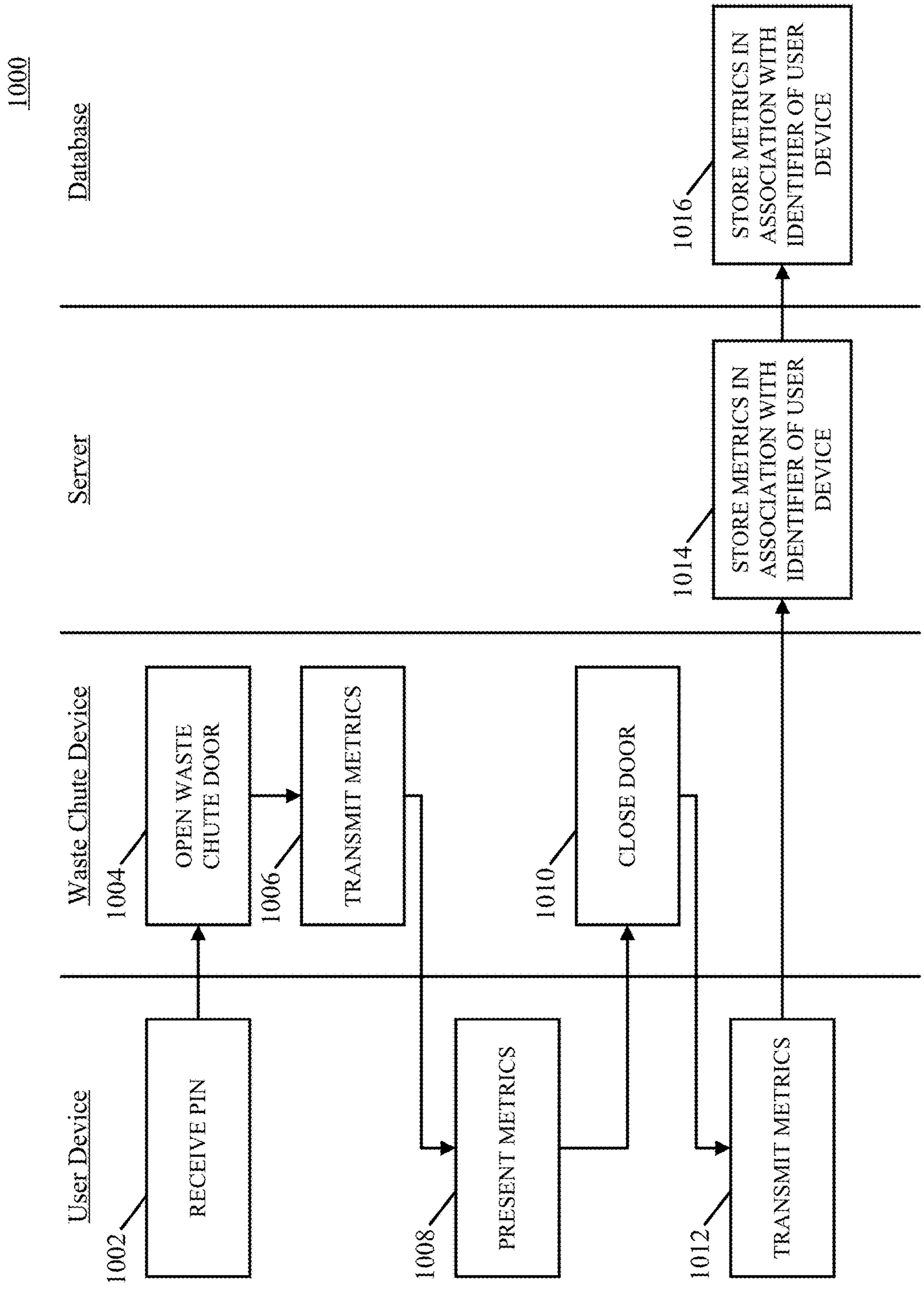
FIG. 10 shows an example of an information flow diagram for opening a waste chute device in accordance with some embodiments of the disclosed subject matter.

Turning to FIG. 10, an example 1000 of an information flow diagram for operating waste chutes is shown in accordance with some embodiments of the disclosed subject matter. As illustrated, in some embodiments, blocks of process 1000 can be executed on a computing device, a waste chute device, a server, and/or a database.

At 1002, a computing device can receive a PIN or other identifier of a user of the computing device. For example, as described above in connection with blocks 902 and/or 904 of process 900, the computing device can receive an identifier of the user, such as a selection of an apartment number the user lives in, and/or any other suitable identifier. As another example, in some embodiments, the computing device can receive a PIN or a password that authenticates the user to the computing device and/or the waste chute device. In some embodiments, the computing device can receive the PIN or other identifier in any suitable manner, such as via a user interface presented on the computing device, via an input keypad associated with the computing device, and/or in any other suitable manner.

At 1004, the waste chute device can open a door of the waste chute device. As described above in connection with block 906 of FIG. 9, in some embodiments, the waste chute device can cause the door to be opened in any suitable manner. For example, in some embodiments, the waste chute device can cause the door of the waste chute device to open using an actuator. As another example, in some embodiments, the waste chute device can deactivate a smart lock associated with the door of the waste chute.

At 1006, the waste chute device can transmit any suitable metrics associated with content placed in the waste chute device to the computing device. For example, as described above in connection with block 908 of FIG. 9, in some embodiments, the metrics can include a number of bags detected in the waste chute, a weight of content placed in the waste chute, an indication that content not allowed to be placed in the waste chute (e.g., particular materials that are to be recycled, organic matter, hazardous material, oversized material, and/or any other suitable type of material) has been detected in the waste chute, and/or any other suitable metrics. Note that, as described above in connection with block 908 of FIG. 9, in some embodiments, the metrics can be determined in any suitable manner by the waste chute device, such as using a camera associated with the waste chute device, using a sensor (e.g., an accelerometer or other sensor for detecting mass, a through-beam sensor for detecting disruptions in a beam that are correlated with a number of items placed in the waste chute device) associated with the waste chute device, and/or in any other suitable manner. Additionally, in some embodiments, the waste chute device can transmit historical information, such as a total amount of waste disposed of by a user associated with the received identifier and/or PIN of block 1002 over any suitable time period (e.g., in the past week, in the past month, in the past year, and/or any other suitable time period), and/or information indicating amounts of waste disposed of by other users (e.g., other users in the building that use the waste chute device, and/or any other suitable users). Note that, in instances where the metrics include historical information or amounts of waste disposed of by other users previously, the waste chute device can receive the metrics from any suitable source, such as the server and/or the database.

At 1008, the computing device can present metrics received from the waste chute device. For example, as shown in and described above in connection with FIG. 5C, the computing device can present metrics indicating a total amount of waste previously disposed of by a user of the waste chute device over any suitable time period, a comparison of the amount of waste disposed of by the user to other users of the waste chute device, and/or any other suitable information. As another example, in some embodiments, the computing device can present an indication of the detected number of items placed in the waste chute device in comparison with the number of items indicated by the user as being placed in the waste chute device. As yet another example, in some embodiments, the computing device can indicate a fee or payment associated with a current amount of waste disposed of using the waste chute device and/or a total amount the user has paid to dispose of waste using the waste chute device over any suitable time period (e.g., over the past week, over the past month, over the past year, and/or over any other suitable time period). As yet another example, in some embodiments, the computing device can indicate an amount remaining in a waste disposal budget associated with the current user of the waste chute device (e.g., the user associated with the identifier or PIN received at block 1002, and/or any other suitable user).

At 1010, the waste chute device can cause the door of the waste chute device to be closed. Similarly to as described above at block 1004 and in connection with block 914 of FIG. 9, the waste chute device can cause the door to close in any suitable manner, such as using an actuator associated with the door. Additionally, as described above in connection with block 914 of FIG. 9, in some embodiments, the waste chute device can activate a smart lock associated with the door, thereby locking the door of the waste chute device.

At 1012, the computing device can transmit any suitable metrics received from the waste chute device relating to a current use of the waste chute device to the server. For example, in some embodiments, the computing device can transmit metrics that indicate an amount of waste placed in the waste chute device (e.g., a number of bags, a total weight, and/or any other suitable indication of amount), whether any forbidden content was placed in the waste chute, an indication of a fee charged to dispose of the waste, and/or any other suitable information. Note that, in some embodiments, the waste chute device can directly transmit the metrics to the server. In some embodiments, the computing device can transmit the metrics in any suitable manner, such as via communication network 302 as shown in and described above in connection with FIG. 3. In some embodiments, the metrics can be associated with an identifier of a current user of the waste chute device, such as a user identifier received as described above in connection with block 1002 of FIG. 10.

At 1014 and/or 1016, the server and/or the database can store the received metrics in associated with an identifier of a current user of the computing device. Note that, in some embodiments, the database can be stored on the server, and, in some such embodiments, block 1014 can be omitted. In some embodiments, the user identifier can be used as a key to a table or other database structure whose values indicate metrics relating to waste disposed of by the user (e.g., dates or times the user has used the waste chute device, amounts of waste disposed of on each date, and/or any other suitable information). Note that, in some embodiments, the server and/or the database can store information from any suitable number of users of the waste chute device (e.g., five, ten, one hundred, one thousand, and/or any other suitable number) and/or relating to users of any suitable number of waste chute devices (e.g., five, ten, one hundred, one thousand, and/or any other suitable number).

In some embodiments, at least some of the above described blocks of the processes of FIGS. 9 and 10 can be executed or performed in any order or sequence not limited to the order and sequence shown in and described in connection with the figures. Also, some of the above blocks of FIGS. 9 and 10 can be executed or performed substantially simultaneously where appropriate or in parallel to reduce latency and processing times. Additionally or alternatively, some of the above described blocks of the processes of FIGS. 9 and 10 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, waste chute devices and methods for using the same are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for operating waste chutes is provided, the method comprising:

allowing a door assembly of the waste chute device to be opened upon confirming an identity of a user;

determining, using a hardware processor of the waste chute device, that a plurality of items have been placed in an opening of the waste chute device by the user;

receiving, from an imaging device positioned in an interior portion of the waste chute device, an image associated with the plurality of items that have been placed in the waste chute device;

determining, using the hardware processor, a type associated with each of the plurality of items that have been placed in the waste chute based on the received image;

sorting each of the plurality of items into one of a plurality of containers based on the determined type associated with each of the plurality of items that have been placed in the waste chute; and updating, using the hardware processor, account information associated with the user based on the plurality of sorted items.

2. The method of claim 1, wherein the identity associated the user includes an identifier corresponding to a dwelling of the user.

3. The method of claim 1, further comprising associating with a mobile device of the user, wherein the identity of the user is determined based on the association with the mobile device.

4. The method of claim 1, wherein allowing the door assembly of the waste chute device to be opened comprises transmitting an instruction to an actuator that is connected to the hardware processor of the waste chute device, wherein the instruction causes the actuator to automatically open the door assembly of the waste chute device.

5. The method of claim 1, wherein allowing the door of the waste chute device to be opened comprises transmitting an instruction to an electronic lock that is connected to the hardware processor of the waste chute device, wherein the instruction causes the electronic lock to unlock the door assembly of the waste chute device.

6. The method of claim 1, further comprising determining a number of the plurality of items placed in the waste chute device by (i) receiving a user selection of a number of items via a user interface presented on a display device associated with the waste chute device and (ii) comparing the number of items received via the user interface with the number of items determined from the imaging data.

7. The method of claim 1, further comprising determining a number of the plurality of items placed in the waste chute device by (i) receiving a user selection of a number of items via a user interface presented on a display device associated with the waste chute device, (ii) receiving sensor data from a through-beam sensor that is connected to the hardware processor and that emits a beam within the opening of the waste chute device, and (iii) comparing the number of items received via the user interface with the number of items determined from the sensor data.

8. The method of claim 1, wherein the updated account information includes fee information for disposing the plurality of items placed in the waste chute device.

9. The method of claim 1, further comprising determining that an item of the plurality of items placed in the waste chute device is not to be accepted by the waste chute device based on the type associated with the item.

10. The method of claim 1, further comprising:

receiving weight data associated with the plurality of items that have been placed in the waste chute device via a scale connected to the hardware processor; and determining whether the weight data corresponds to a number of items placed in the waste chute device.

11. The method of claim 1, wherein at least one of the plurality of containers includes a compactor that compresses a sorted item from the plurality of items.

12. The method of claim 1, wherein the type includes an organic matter type and wherein at least one of the plurality of containers corresponding to the organic matter type includes a digester for composting a sorted item of the organic matter type from the plurality of items.

13. A waste chute device, comprising:

a chute door on a housing of the waste chute device that, when opened, provides an opening that is connected to a vertical waste chute; and a hardware processor connected to the computing device, wherein the hardware processor is configured to:

allow the chute door of the waste chute device to be opened upon confirming an identity of a user;

determine that a plurality of items have been placed in the opening of the waste chute device by a user;

receive, from an imaging device positioned in an interior portion of the housing of the waste chute device, an image associated with the plurality of items that have been placed in the waste chute device;

determine a type associated with each of the plurality of items that have been placed in the waste chute based on the received image;

sort each of the plurality of items into one of a plurality of containers based on the determined type associated with each of the plurality of items that have been placed in the waste chute; and update account information associated with the user based on the plurality of sorted items.

14. The system of claim 13, wherein the identity associated the user includes an identifier corresponding to a dwelling of the user.

15. The system of claim 13, wherein the hardware processor is further configured to associate with a mobile device of the user, and wherein the identity of the user is determined based on the association with the mobile device.

16. The system of claim 13, wherein the waste chute device further comprises an actuator that is connected to the chute door, and wherein allowing the chute door of the waste chute device to be opened comprises transmitting an instruction to the actuator that automatically opens the chute door of the waste chute device.

17. The system of claim 13, wherein the waste chute device further comprises an electronic lock that is connected to the chute door, and wherein allowing the chute door of the waste chute device to be opened comprises transmitting an instruction to an electronic lock that unlocks the chute door of the waste chute device.

18. The system of claim 13, wherein the waste chute device further comprises a display device positioned within the housing of the waste chute device, and wherein the hardware processor is further configured to determine a number of the plurality of items placed in the waste chute device by (i) receiving a user selection of a number of items via a user interface presented on the display device associated with the waste chute device and (ii) comparing the number of items received via the user interface with the number of items determined from the imaging data.

19. The system of claim 13, wherein the waste chute device further comprises a display device positioned within the housing of the waste chute device, and wherein the hardware processor is further configured to determine a number of the plurality of items placed in the waste chute device by (i) receiving a user selection of a number of items via a user interface presented on the display device associated with the waste chute device, (ii) receiving sensor data from a through-beam sensor that is connected to the hardware processor and that emits a beam within the opening of the waste chute device, and (iii) comparing the number of items received via the user interface with the number of items determined from the sensor data.

20. The system of claim 13, wherein the updated account information includes fee information for disposing the plurality of items placed in the waste chute device.

21. The system of claim 13, wherein the hardware processor is further configured to determine that an item of the plurality of items placed in the waste chute device is not to be accepted by the waste chute device based on the type associated with the item.

22. The system of claim 13, wherein the waste chute device further comprises a scale that is connected to the hardware processor, and wherein the hardware processor is further configured to:

receive, from the scale, weight data associated with the plurality of items that have been placed in the waste chute device; and determine whether the weight data corresponds to a number of items placed in the waste chute device.

23. The system of claim 13, wherein the waste chute device further comprises a compactor, and wherein at least one of the plurality of containers includes the compactor that compresses a sorted item from the plurality of items.

24. The system of claim 13, wherein the waste chute device includes a digester, wherein the type includes an organic matter type, and wherein at least one of the plurality of containers corresponding to the organic matter type includes the digester for composting a sorted item of the organic matter type from the plurality of items.

* * * * *